(12) United States Patent
Greco

(10) Patent No.: US 9,471,400 B1
(45) Date of Patent: Oct. 18, 2016

(54) REENTRANT READ-WRITE LOCK ALGORITHM

(71) Applicant: International Business Machines Corporation, Armonk, NY (US)

(72) Inventor: Marco Greco, Staines (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/810,510

(22) Filed: Jul. 28, 2015

(51) Int. Cl.
*G06F 9/46* (2006.01)
*G06F 9/52* (2006.01)
*G06F 9/50* (2006.01)

(52) U.S. Cl.
CPC .............. *G06F 9/528* (2013.01); *G06F 9/5027* (2013.01)

(58) Field of Classification Search
None
See application file for complete search history.

(56) References Cited

U.S. PATENT DOCUMENTS

| | | | |
|---|---|---|---|
| 7,653,791 | B2 | 1/2010 | McKenney |
| 8,539,168 | B2 | 9/2013 | Dice et al. |
| 8,627,048 | B2 | 1/2014 | Welc et al. |
| 8,869,127 | B2 | 10/2014 | Dolby et al. |
| 2003/0079094 | A1* | 4/2003 | Rajwar ............... G06F 9/3004 711/150 |
| 2009/0254907 | A1* | 10/2009 | Neary .................. G06F 9/5027 718/102 |

FOREIGN PATENT DOCUMENTS

JP     5035277 B2     9/2012

OTHER PUBLICATIONS

IBM, List of IBM Patents or Patent Applications Treated as Related, Appendix P, dated May 6, 2016, 2 pages.
Pending U.S. Appl. No. 15/146,918, filed May 5, 2016, entitled; "Reentrant Read-Write Lock Algorithm", pp. 1-80.
Oracle, "Class ReentrantReadWriteLock," ReentrantReadWriteLock (Java Platform SE 7), http://docs.oracle.com/javase/7/docs/api/java/util/concurrent/locks/ReentrantReadWriteLock.html, Printed on Jun. 24, 2015, pp. 1-9.
Floyd, "recursive mutexes," Google Groups, comp.programming.threads, https://groups.google.com/forum/#!topic/comp.programming.threads/tcrTKnfP8HI[1-25], Jul. 15, 2004, Printed on Jun. 24, 2015, pp. 1-1.
Butenhof, "Recursive mutexes by David Butenhof," Zaval creative engineering group, http://www.zaval.org/resources/library/butenhof1.html, May 17, 2005, Printed on Jun. 24, 2015, pp. 1-3.
Google Groups, "Recursive mutexes," comp.programming.threads, https://groups.google.com/forum/?hl=en#!msg/comp.programming.threads/GeQN_xHztFE/DEIrhOsBFAEJ, Mar. 23, 2005, Printed on Jun. 24, 2015, pp. 1-1.

(Continued)

*Primary Examiner* — Craig Dorais
(74) *Attorney, Agent, or Firm* — David Zwick

(57) ABSTRACT

Access to a shareable resource between threads is controlled by a lock having shared, optimistic and exclusive modes and maintaining a list of threads requesting ownership of said lock. A shared optimistic mode is provided. A lock state descriptor is provided for each desired change of mode comprising a current mode in which a thread has already acquired the lock. When a thread acquires the lock in shared optimistic mode, other threads are allowed to acquire the lock in shared or optimistic mode. When a thread which acquired the lock in shared optimistic mode wants to acquire the lock in exclusive mode, other threads which have acquired the lock in shared or optimistic mode are prevented from acquiring the lock in exclusive mode until the thread which acquired the lock in shared optimistic mode and requested to acquire the lock in exclusive mode releases the lock.

7 Claims, 24 Drawing Sheets

(56) References Cited

OTHER PUBLICATIONS

Erb, "Concurrent Programming for Scalable Web Architectures (../index.html)," Diploma Thesis by Benjamin Erb, 5.2 Concurrency Based on Threads, Locks and Shared State, http://berb.github.io/diploma-thesis/original/052_threads.html, Printed on Jan. 30, 2015, pp. 1-8.

Fu et al., "Formal verification of concurrent programs with read-write locks," Research Article, Frontiers of Computer Science in China, Mar. 2010, vol. 4, Issue 1, pp. 65-77.

Shirako et al., "Design, Verification and Applications of a New Read-Write Lock Algorithm," SPAA '12, Jun. 25-27, 2012, Pittsburgh, PA, pp. 1-10.

Ishizaki et al., "Transforming Java Programs for Concurrency using Double-Checked Locking Pattern," Performance Analysis of Systems and Software (ISPASS), 2014 IEEE International Symposium, pp. 1-2.

Calciu et al., "NUMA-Aware Reader-Writer Locks," PPoPP '13, Proceedings of the 18th ACM SIGPLAN symposium on Principles and practice of parallel programming, Feb. 23-27, 2013, pp. 1-11.

* cited by examiner

LOCKSTATE_MARK

LOCKSTATE_LOWER

REENTRANT READ-WRITE LOCK ALGORITHM

BACKGROUND

The present invention relates to read-write lock algorithms, and more specifically to optimizing usage of such locks.

Within the class of passive locking algorithms there is a set known as recursive locks, otherwise known as reentrant or relockable locks. Recursive, reentrant and relockable locks are slightly different in the type of problem they try to address, but the most used implementation, relockable mutexes, addresses all three types of scenarios.

Non-reentrant locks can only be acquired once, meaning that if a process or thread tries to acquire a lock it already owns, it will stall waiting on itself. However, recursive locks can be acquired multiple times by the owner, the lock being relinquished when the owner releases the lock the same number of times it had previously acquired it. The usual implementation of recursive locks adds a lock counter (and a lock owner) to the lock structure, with the lock being available if the counter is zero, and busy otherwise.

Proponents of recursive locks highlight flexibility as their best feature. By just switching to recursive locks, an algorithm dealing with recursive structures or, for Object Oriented languages, derived classes, can easily be switched to being multithreaded without any other change. Asynchronous routines that deal with a shared structure can be executed without fear of deadlock due to the interrupted thread already owning the lock controlling the resources, and software functions manipulating a specific resource can be implemented to be called both in the case where the lock is already owned by the caller and the case where it is not, which greatly helps in terms of code reuse and maintainability. Conversely, opponents of recursive locks highlight a substantial performance penalty compared to non recursive locks and obfuscating interaction between participant threads, possibly hiding unintended or unforeseen behavior.

Read-write locks are a class of locks which allow multiple threads to access a controlled structure in read mode concurrently. Modification of the structure entails acquiring the lock in an exclusive mode. Read-write locks offer clear concurrency advantages over non-shared types of locks in environments where structures are modified seldom but accessed very frequently.

Relockable mutexes have a lock count and a mutex owner in order to be able to track the number of times the owner has acquired the lock and avoid self stalls. In a similar way, read-write locks have a reader count, so that a prospective exclusive locker has to wait for the reader count to revert to zero before it is allowed to acquire the lock. In order to promote fairness, while there are waiters in the lock queue, new readers will be made to wait even if readers are already accessing the controlled resource, so that writers have a chance to modify the shared resource in a timely manner.

Since, for performance and space reasons, readers are only tracked in number and not in identity, the logical step of first acquiring the read-write lock in shared mode and then recursively promote it to exclusive, rather than having the intended effect, will in fact produce a self stall.

Prior art relockable read-write mutexes offer no advantage over plain read-write locks mutexes in this respect. Keeping track of the number of exclusive locks by the same thread plus keeping track of the number of shared lockers, means that relockable mutexes will self stall when recursively mixing shared and exclusive lock attempts, in whatever order they happen.

Consider now the following scenario: a large concurrent application uses a complex shareable resource which exists as a single entity, but can be divided into subcomponents or portions, each of which can be modified individually, but cannot exist on its own. A real world scenario is a dictionary cache for a server. Industrial strength SQL servers, for instance, comprise, among others, a dictionary cache of tables, so that information about individual tables does not have to be accessed from disk every time a statement is parsed.

Individual cache entries comprise several parts, such as table name and owner, columns and types, indexes, check constraints and referential constraints. Some of the parts will make references to other entries, or entries in different dictionary caches, for example, referential constraints will point to dependent tables, or, in extensible SQL engines, column types may point to a user defined types dictionary cache. In terms of code reusability, it makes sense to have individual functions each dealing with individual parts, for instance one function to load table information, one for columns, one for indexes, one for constraints and the like.

When loading information about a table previously missing from the cache, since the entry information has no meaning until all the individual parts are available, a wrapper function would call in turn all the functions dealing with each individual parts and once successful push the new entry into the cache.

When new indexes are created, or dropped, only the function dealing with indexes needs to be called, but this time with the whole cache entry locked (the information still has no meaning until the new index information is updated).

When preparing a new statement, information about tables referenced by foreign key constraints needs to be checked, because the primary key table might have changed, its dictionary cache entry might be stale and referential constraints information would then need to be reloaded. This activity does not require an exclusive lock. It is only necessary to make sure that the current entry does not change when performing the check, which can be done with a shared lock, an exclusive lock only being needed if the constraint information is found to be stale and needs to be reloaded. Since during normal operation no changes would be expected in any table cache entry, being unable to perform such checks in parallel can constitute a serious performance bottleneck, depending on engine load and the popularity among statements of the table itself.

With current locking technology, there are several options. With plain locks, either code is duplicated, such as to handle a new table entry, and individual parts, when they are individually modified, or infrastructure is needed to pass the lock state in between wrapper and inner functions. Since the entry lock can only be acquired in exclusive mode, only one thread can check each individual entry for stale referential constraints information. This means that parsing statements using the same table is serialized.

With recursive locks, code reutilization is fine, albeit with a (possibly small) performance penalty. As the complexity of the code grows, the interaction between nested locks might become obfuscated, making code maintenance more complex. In time, having a single code line might become more complex than maintaining two specialized copies of the same code. Referential constraint information checking is still serialized.

With read-write locks, the same code reutilization problem exists as with plain locks. Contrary to expectations, a referential constraint checking operation in this example cannot be easily parallelized. Assume for a moment that the checking itself is done using shared locks. When the referenced table dictionary entry is found to be stale, meaning that the referential constraint needs to be reloaded, the lock will then have to be promoted to exclusive by releasing it and reacquiring it in exclusive mode. However once the lock has been promoted, there is no guarantee that the structure being checked has not changed, since other threads could have acquired the lock in exclusive mode and modified the structure during our wait for the lock promotion.

This means that after having promoted the lock, the shared resource must be checked again for changes and restart possibly from the beginning of the outer wrapper function. This may not seem like a major drawback, but when many threads are checking the structure concurrently and all find it out of date, all will have to promote the lock and recheck the structure with the lock held in exclusive mode, which means that any change detected by more than one thread at the same time will result in many serialized rechecks, leading to a substantial bottleneck on the lock. Given the complexity of this operation, many times an easier choice is to just acquire the lock in exclusive mode from the beginning, again giving up on parallelism.

The most desirable option would, of course, be a lock that allows both code reutilization and parallel operation during structure validation.

Java class "ReentrantReadWriteLock", the details of which can be found at http://docs.oracle.com/javase/7/docs/api/java/util/concurrent/locks/.

ReentrantReadWriteLock.html discloses a simple implementation of a read write lock that can be locked multiple times and that can be promoted from read to write. It does not allow multiple readers to check a structure in parallel, and on detecting a change, avoid a thundering herd of lock promoters all trying to amend the structure in the same way and at the same time. A reader of the lock can only upgrade the lock to write mode if it is the only reader around, which can lead to stalls.

BRIEF SUMMARY

According to an embodiment of the invention, a computer-implemented method for managing access to a shareable resource between a plurality of concurrently executing threads, access to the shareable resource being controlled by a lock, the lock being adapted to be accessed by one or more of the plurality of concurrently executing threads in at least a shared mode, an optimistic mode and an exclusive mode and the lock maintaining a list of threads requesting ownership of the lock, the method comprises: providing a shared optimistic mode for the lock, the lock being acquirable in the shared optimistic mode by one or more of the plurality of concurrently executing threads; providing, for each change of mode desired by one of the concurrently executing threads, a lock state descriptor, the lock state descriptor comprising an indication of the current mode, if any, in which the one of the concurrently executing threads has already acquired the lock; responsive to the one or more of the concurrently executing threads acquiring the lock in the shared optimistic mode, allowing others of the one or more concurrent threads to acquire the lock in the shared mode or the optimistic mode; and responsive to the one or more of the concurrently executing threads which has acquired the lock in the shared optimistic mode requesting to acquire the lock in the exclusive mode, preventing others of the one or more of the concurrently executing threads which have acquired the lock in the shared mode or the optimistic mode from acquiring the lock in the exclusive mode until the one or more of the concurrently executing threads which has acquired the lock in the shared optimistic mode requesting to acquire the lock in the exclusive mode releases the lock.

This embodiment provides the advantage of having threads flag a possible intent of modifying a portion of a shareable resource before checking it and when the portion is found to be needing a refresh, rather than switching a plurality of readers to a trickle of writers, repeatedly updating the portion one at a time, only a first thread promotes the lock to exclusive and modifies the portion. At this point, all other threads that found the portion to be wanting check again, in parallel, that the refresh done by the exclusive locker is up to date, thus avoiding both subsequent needless modifications to the portion and a substantial bottleneck on the lock caused by all the other threads acquiring the lock in an exclusive modes for a fairly long period of time.

In an embodiment, the lock state descriptor comprises an indication of the current relationship between the lock and the one of the concurrently executing threads.

In an embodiment, each request for a change of mode to the optimistic mode comprises an identifier identifying a portion of the shareable resource that the requestor making the request wishes to access. This embodiment has the advantage that the current lock owner, on releasing the lock, wakes up only those requesters who that use the same identifier, rather than waking up the optimistic lock promoters. This releases just threads waiting on the portion of the shareable resource, but not threads waiting on other portions, thereby avoiding further contention.

In an embodiment, each lock state descriptor further comprises a count of the number of attempts to access the lock in the shared optimistic mode, the one of the concurrently executing threads attempting to access the lock in the shared optimistic mode having its attempt to access the lock terminated when the count reaches a predetermined value. This embodiment has the advantage of avoiding infinite loops of a thread being asked to retry checking in optimistic mode.

In an embodiment, responsive to the one or more of the concurrently executing threads releasing the lock from the exclusive mode; updating a current mode or a requested mode in the lock state descriptor as being "amended" in order to indicate that a lock promoter from the optimistic mode to the exclusive mode was successful in altering the shareable resource being controlled by the lock; updating the current mode or the requested mode in the lock state descriptor as being "preserved" in order to indicate that the lock promoter from the optimistic mode to the exclusive mode did not make a change to the structure or the requested mode; and updating the current mode or the requested mode in the lock state descriptor as being "failed" in order to indicate that the lock promoter from the optimistic mode to the exclusive mode was unsuccessful in altering the shareable resource being controlled by the lock.

In an embodiment, the lock state descriptor further comprises an indication as to whether, on resuming a lower lock state from a higher lock state, the lock state should be reset to that of the lower lock state so as to preserve the previous lower lock state or the lock state should be propagated from the higher lock level to the lower lock level. This embodiment provides the advantage that keeping the exclusive lock until the shareable resource has been checked and amended and releasing all the optimistic lock requestors at the end of the modifications. It also has the advantage that when no other portion of the shareable resource needs modifying, reverting as quickly as possible to a read lock boosts concurrency.

In an embodiment, higher lock levels do not acquire or release the lock if the shareable resource being managed by the lock has not been published.

Embodiments of the invention provide a system for managing access to a shareable resource between a plurality of concurrently executing threads, the system comprising: a lock for controlling access to the shareable resource, the lock being adapted to be accessed by one or more of the plurality of concurrently executing threads in at least a shared mode, an optimistic mode and an exclusive mode and the lock maintaining a list of threads requesting ownership of the lock, the lock comprising: a shared optimistic mode for the lock, the lock being acquirable in the shared optimistic mode by the one or more of the concurrently executing threads; a lock state descriptor for each change of mode desired by one of the concurrently executing threads, the lock state descriptor comprising an indication of the current mode, if any, in which the one of the concurrently executing threads has already acquired the lock; and wherein: responsive to the one or more of the concurrently executing threads acquiring the lock in the shared optimistic mode, allowing others of the one or more concurrent threads to acquire the lock in the shared mode or the optimistic mode; and responsive to the one or more of the concurrently executing threads which has acquired the lock in the shared optimistic mode requesting to acquire the lock in the exclusive mode, preventing others of the one or more of the concurrently executing threads which have acquired the lock in the shared mode or the optimistic mode from acquiring the lock in the exclusive mode until the one or more of the concurrently executing threads which has acquired the lock in the shared optimistic mode requesting to acquire the lock in the exclusive mode releases the lock.

Embodiments of the invention also provide a computer program product for managing access to a shareable resource between a plurality of concurrently executing threads, access to the shareable resource being controlled by a lock, the lock being adapted to be accessed by one or more of the plurality of concurrently executing threads in at least a shared mode, an optimistic mode and an exclusive mode and the lock maintaining a list of threads requesting ownership of the lock, the computer program product comprising: a computer readable storage medium having program instructions embodied therewith, the program instructions executable by a computer to cause the computer to: provide a shared optimistic mode for the lock, the lock being acquirable in the shared optimistic mode by one or more of the plurality of concurrently executing threads; provide, for each change of mode desired by one of the concurrently executing threads, a lock state descriptor, the lock state descriptor comprising an indication of the current mode, if any, in which the one of the concurrently executing threads has already acquired the lock; responsive to the one or more of the concurrently executing threads acquiring the lock in the shared optimistic mode, allow others of the one or more concurrent threads to acquire the lock in the shared mode or the optimistic mode; responsive to the one or more of the concurrently executing threads which has acquired the lock in the shared optimistic mode requesting to acquire the lock in the exclusive mode, prevent others of the one or more of the concurrently executing threads which have acquired the lock in the shared mode or the optimistic mode from acquiring the lock in the exclusive mode until the one or more of the concurrently executing threads which has acquired the lock in the shared optimistic mode requesting to acquire the lock in the exclusive mode releases the lock.

BRIEF DESCRIPTION OF THE DRAWINGS

Preferred embodiments of the present invention will now be described in more detail, by way of example only, with reference to the accompanying drawings, in which.

DETAILED DESCRIPTION

Figure 1:
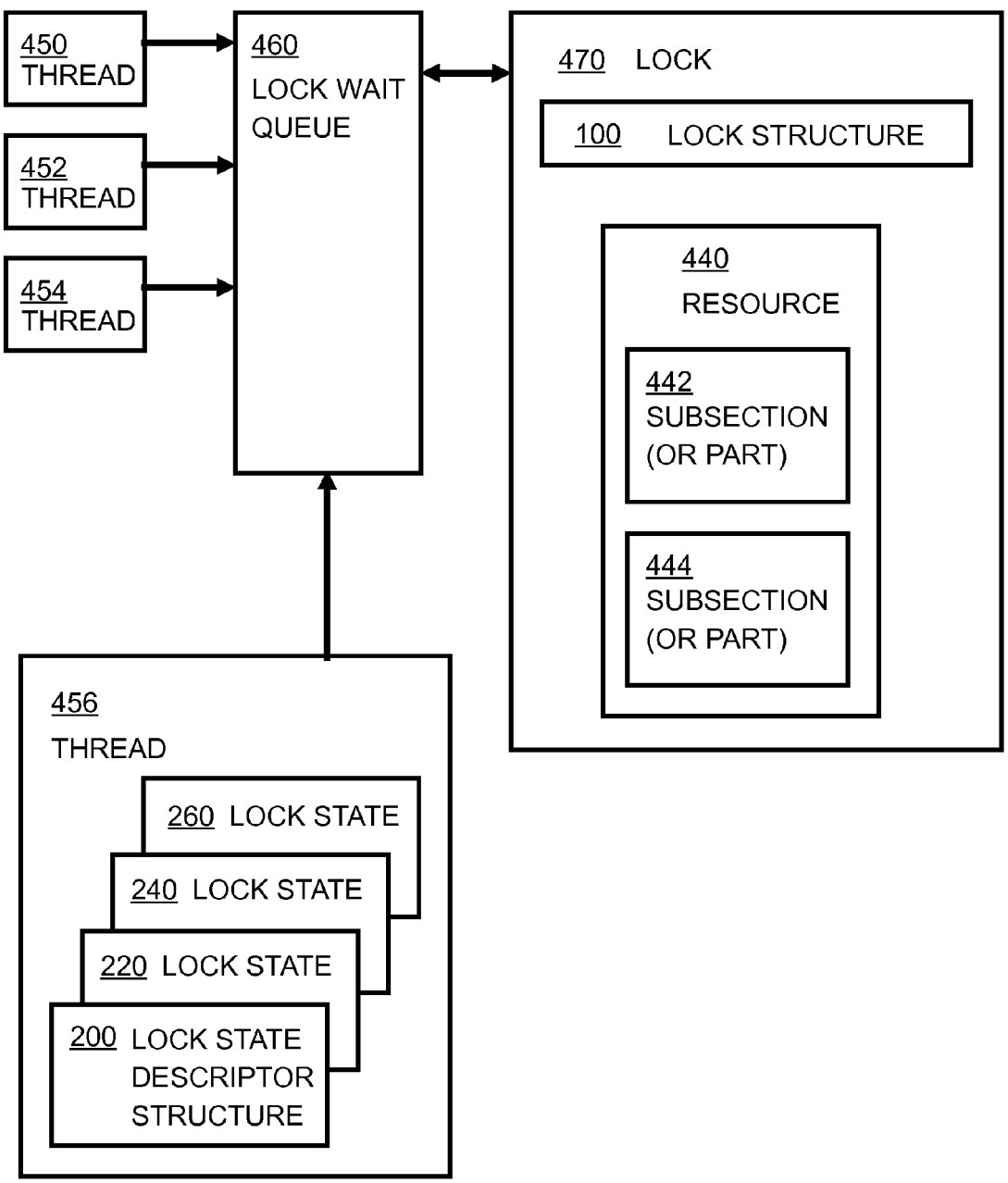
FIG. 1 is a block diagram of a system in which embodiments of the present invention may be implemented.

Embodiments of the invention provide a shared lock so as to take advantage of parallelism in operations such as check-reloads, independently of any code reutilization issues being addressed. These embodiments provide a reentrant lock infrastructure that allows code to be reutilized while maintaining lock states consistent with the operation being performed.

Embodiments of the invention provide a new lock that adds a fourth state to read-write locks, referred to hereinafter as a Shared Optimistic state. The behavior of such a lock is as described below.

When the lock is in the unlocked state, any thread can acquire it in any of the other modes.

When the lock has been acquired in shared mode by one or more threads, other threads can still acquire the lock in shared or optimistic mode, providing parallel read operations. Threads wishing to acquire the lock in exclusive mode will have to wait for the current readers (in either shared or optimistic mode) to release the lock before they can proceed. When a particular thread wants to switch from shared to exclusive mode, there is no guarantee that by the time it acquires the lock in exclusive mode, other writers haven't changed the structure protected by the lock.

When the lock has been acquired in a shared optimistic mode, according to embodiments of the present invention, by one or more threads, one or more of the other concurrently executing threads can still acquire it in shared or optimistic mode, providing parallel read operations. Threads wishing to acquire the lock in exclusive mode have to wait for the current readers (in either shared or optimistic mode) to release the lock before they can proceed. When a particular thread wants to switch from shared optimistic to exclusive mode, it has to wait for the other current readers to release the lock, but other threads wishing to acquire the lock in exclusive mode are prevented from acquiring the lock until the thread promoting the lock from optimistic to exclusive has released the lock, thus providing a partial guarantee that writers have not changed the structure protected by the lock. This means that when the lock is in a transient state whereby there are no reader lock owners (the last one having just released the lock), but an optimistic reader wanting to promote the lock to exclusive has not yet made it to a running state, any new thread wanting to acquire the lock in whichever mode will be placed in lock wait queue even if the lock is currently (and temporarily) in unlocked state.

When the lock is acquired in exclusive mode, every other thread has to wait for the lock to be released. The important change in behavior compared to read-write locks occurs when the current exclusive lock owner releases the lock. If the lock owner had promoted the lock from optimistic and the initial set of waiters in the queue are other optimistic readers also wanting to promote the lock to exclusive, the lock owner would proceed to wake up all the would be promoters (and readers) it finds at the head of the wait queue, but the promoters would acquire the lock in optimistic mode a second time and would be instructed to perform again whatever operation they were doing.

The advantage of embodiments of the present invention is that, in scenarios as detailed earlier, by having threads flag the possible intent of modifying a substructure before checking it, when the structure is found to be needing a refresh, rather than switching a multitude of readers to a trickle of writers, it is now possible to have only the first thread promote the lock to exclusive and modify the substructure. The trickle of writers would be needlessly repeatedly updating, one at a time (and while readers of other parts of the structure are prevented from operating) the substructure in question. Once the first thread has promoted the lock to exclusive and modified the substructure, at the end of which operation all other threads that found the substructure to be wanting can then check again, in parallel, that the refresh done by the only exclusive locker is up to date, thus avoiding both subsequent needless substructure modifications (which would have to occur with a normal read-write lock) and a substantial bottleneck on the lock itself caused by all other threads acquiring the lock in exclusive mode for a fairly long period of time.

FIG. 1 is a block diagram of a system in which embodiments of the present invention may be implemented. Lock 470 controls access to a shareable resource 440 between a plurality of concurrently executing threads 450-456. Resource 440 comprises a plurality of subsections, or parts 442, 444. Access to the shareable resource 440, or to one of the plurality of subsections, or parts 442, 444, by one or more of the plurality of concurrently executing threads 450-456 is in one or more modes. The lock 470 is adapted to be accessed by one or more of the plurality of concurrently executing threads 450-456 in at least a shared mode, an optimistic mode and an exclusive mode as well as a shared optimistic mode. The lock 470 maintains a list of threads 450-456 requesting ownership of the lock 470, implemented as a lock wait queue 460. Lock 470 comprises a lock structure 100, which will be described below with reference to FIG. 2. Each thread 450-456 comprises lock state descriptors 200, 220-260, there being one lock state descriptor 200, 220-260 for each request by each thread 450-456 to access the lock 470. Lock state descriptor 200, 220-260 will be described below with reference to FIG. 3. The use of a lock state descriptor 200, 220-260 within a thread 450-456 has the advantage that the thread 450-456 does not need to inspect a lock 470 to find out if the thread 450-456 already owns the lock 470. Lock state descriptors 200, 220-260 are associated with threads 450-456, and not locks 470, because in different nested functions a thread 450-456 may have performed lock 470 switches, and the lock state descriptor 200, 220-260 tells the thread 450-456 which state change it needs to perform on the lock 470 to get it to the state in which the caller thread 450-456 expects the lock 470 to be.

Figure 2:
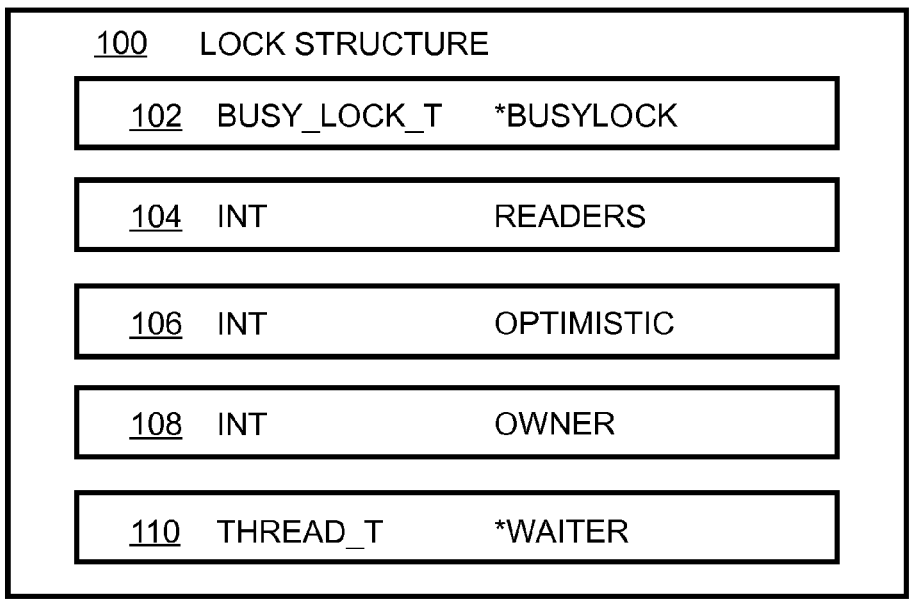
FIG. 2 is a block diagram of a lock structure according to embodiments of the present invention.

FIG. 2 is a block diagram of a lock structure 100 according to embodiments of the present invention. Lock structure 100 comprises busy_lock_t 102 which is a pointer to a busylock structure, such as a test and set, ticket lock or atomic deli counter lock. Readers 104 is a count of the number of concurrently executing threads which are accessing the lock in a read mode. Optimistic 106 is a count of the number of concurrently executing threads which are accessing the lock in an optimistic mode. Owner 108 is an indicator containing an identifier associated with the owner of the lock. Thread_t 110 is a pointer to one of the concurrently executing threads which is waiting to access the lock.

Figure 3:
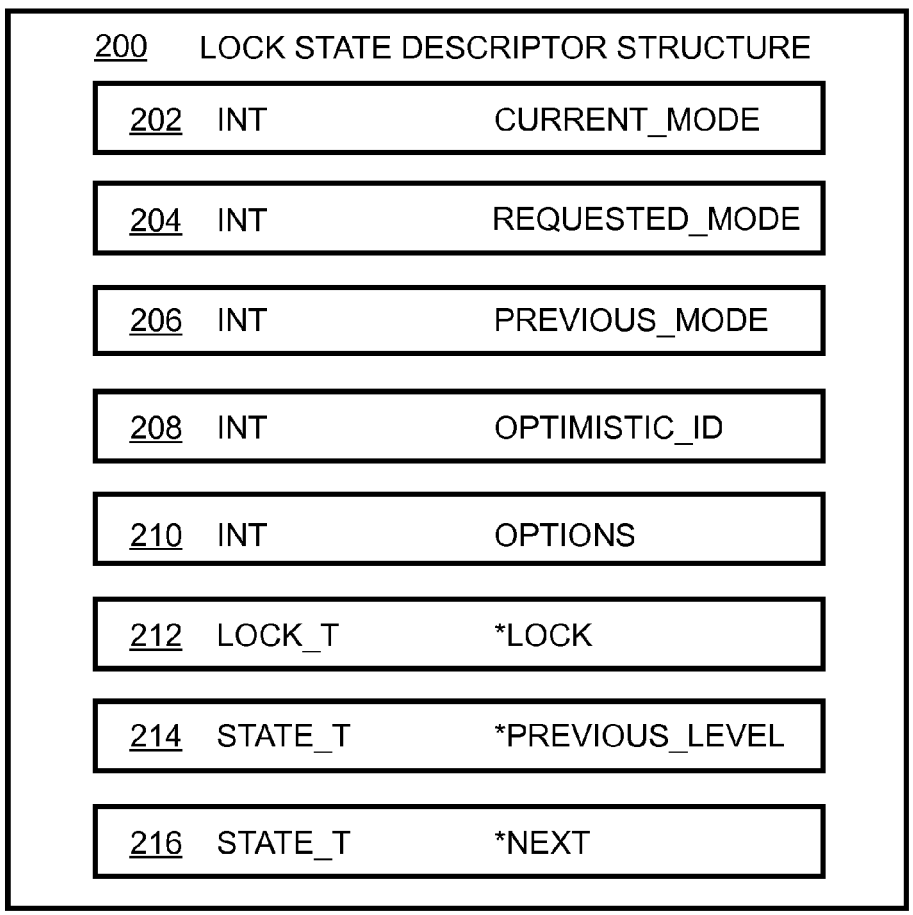
FIG. 3 is a block diagram of a lock state descriptor structure according to embodiments of the present invention.

FIG. 3 is a block diagram of a lock state descriptor structure 200 according to embodiments of the present invention. As mentioned above, there is one lock state descriptor 200, 220-260 for each request by each thread 450-456 to access the lock 470. If there is a plurality of concurrently executing threads 450-456, each making one or more requests to access the lock 470, then there is a lock state descriptor 200, 220-260 associated with each of the requests. Current_mode 202 is an indicator of the current mode, if any, in which the lock 470 is being accessed by the thread 450-456. Requested_mode 204 is an indicator of the desired mode in which the lock 470 is desired to be accessed by the thread 450-456. Previous_mode 206 is an indicator of the previous mode in which the lock 470 was previously accessed by the thread 450-456. Optimistic_ID 208 is an indicator of a subsection, or part 442, 444, of the resource 440, access to which is being controlled by the lock 470. The subsection, or part 442, 444, of the resource is that subsection, or part 442, 444, of the resource 440 that is being amended by the thread 450-456 that has successfully promoted the lock from optimistic 408 state to exclusive 406 state. Options 210 is a set of indications including whether the lock 470 is to be restored (see description below with reference to FIG. 7A) or whether the lock is PRIVATE (see description below with reference to FIG. 8A). Lock_t 212 is a pointer to the lock structure 100 itself. State_t 214 is a pointer to a previous one of the lock state descriptors 200, 220-260. State_t 216 is a pointer to a next one of the lock state descriptors 200, 220-260.

In a computer-implemented method, the lock state descriptor 200, 220-260 comprises an indication of the current relationship between the lock 470 and the one of the concurrently executing threads 200, 220-260.

Figure 4:
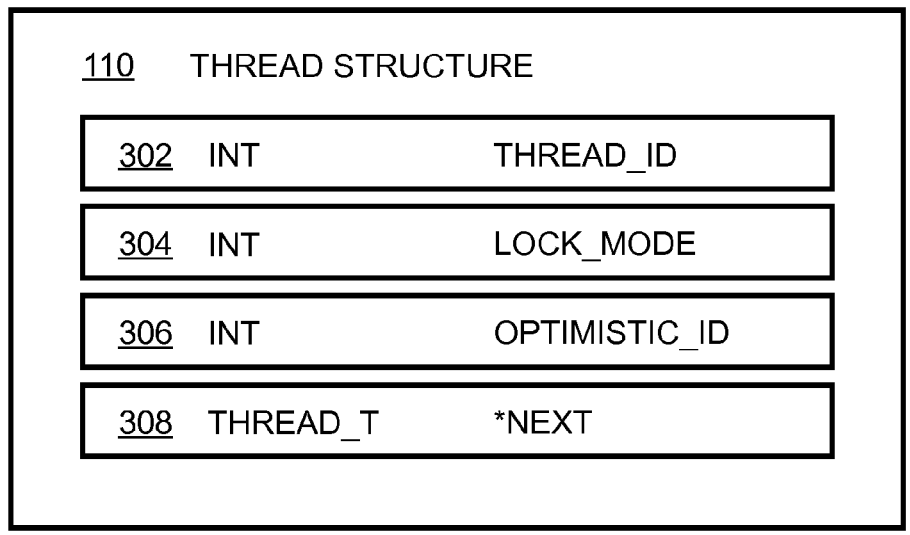
FIG. 4 is a block diagram of a thread structure of the lock structure of FIG. 1 according to embodiments of the present invention.

FIG. 4 is a block diagram of a thread structure 110 of the lock structure 100 of FIG. 1 according to embodiments of the present invention. Thread_ID 302 is an identifier associated with the particular thread structure 110. Lock_mode 304 is an indicator of the mode in which the particular thread currently has access to the lock 470. Optimistic_ID 306 is an identifier of a subsection, or part 442, 444, of the resource 440, access to which is being controlled by the lock 470. Optimistic_ID 306 in the lock structure 100 is a counterpart of the Optimistic_ID 208 in the thread 450-456. Thread_t 308 is pointer to a next one of the thread structures 110.

Figure 5:
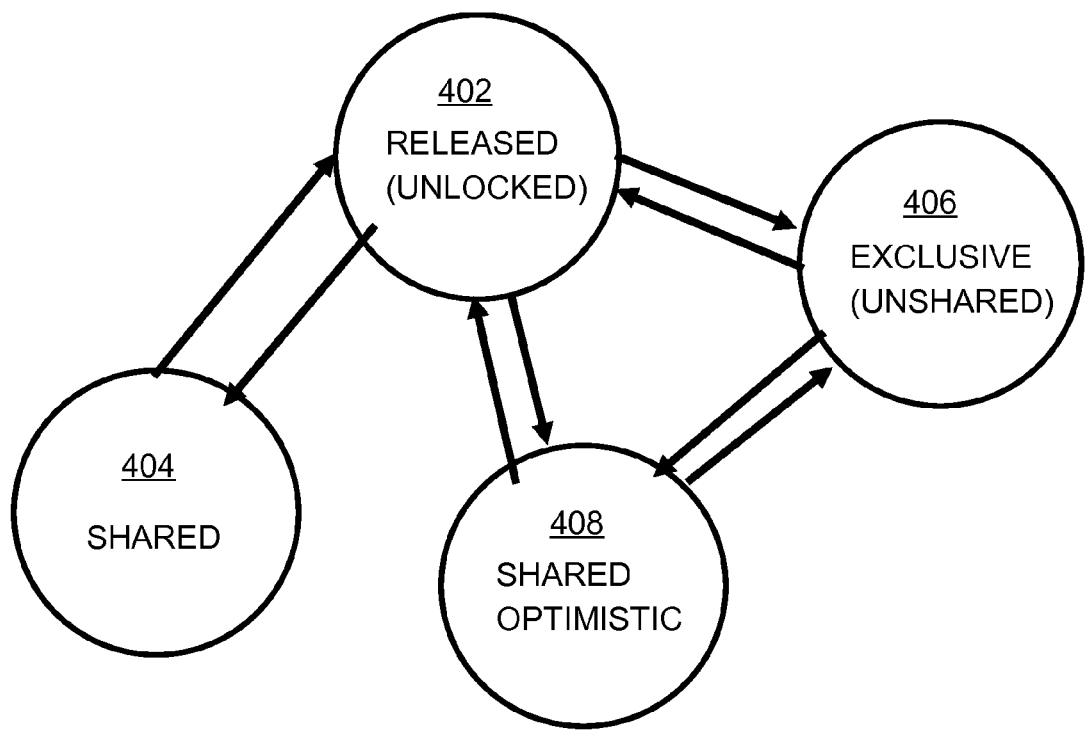
FIG. 5 is a block diagram of lock states of a shared lock.

FIG. 5 is a block diagram of lock states of a shared lock 470. Lock 470 is initially in a released 402 or unlocked state. One or more of the concurrently executing threads 450-456 may access the lock 470 concurrently in a shared 404 mode and may release the lock 470 from the shared 404 mode to a released 402 mode. One of the concurrently executing threads 450-456 may access the lock 470 in exclusive 406 or unshared mode and may release the lock 470 from the exclusive 406 mode to a released 402 mode. One or more of the concurrently executing threads 450-456 may access the lock 470 concurrently in a shared optimistic 408 mode and may release the lock 470 from the shared optimistic 408 mode to a released 402 mode. Additionally, one of the concurrently executing threads 450-456 may transition to access the lock 470 in an exclusive 406 or unshared mode from a shared optimistic 408 mode and may then either release the lock 470 or may return to the shared 406 optimistic mode.

Embodiments of the present invention differ from relational intent locks in that an intent lock on an object flags the presence of a lock on a lower object. For example, an intent lock on a table flags a lock on a row. This prevents other threads from acquiring locks on the table itself. Intent locks do not allow lock promotion on the same object, nor do they allow multiple lock requesters to obtain at the same time as others a lower lock than they had actually requested.

Prior art read-write locks do not keep track of individual read lock owners. This means that promoting a lock 470 from shared optimistic 408 mode to exclusive 406 mode cannot be achieved using a prior art read-write lock. This is because the lock structure 100 does not report whether the requesting thread already owns a shared lock 470 and the lock algorithm cannot determine whether it should proceed with a lock promotion or a lock acquisition.

Embodiments of the present invention add a Lock State Descriptor 200, 220-260, which reports the ownership state (if any) of an individual thread 450-456 on an individual lock 470. Using the information contained in the Lock State Descriptor 200, 220-260 together with the state of the lock structure, embodiments of the present invention allow the lock 470 to transition correctly from one lock state 402-408 to another 402-408.

Embodiments of the invention provide a reentrant lock infrastructure by linking, in a list, lock state descriptors 200, 220-260 for the same lock 470 and thread 450-456. Since each lock state descriptor 200, 220-260 holds the current relationship between the lock 470 and the thread 450-456, the lock 470 does not need to be acquired multiple times. Acquiring the lock 470 once is enough, thereby eliminating performance problems inherent with relockable mutexes.

In an embodiment of the invention, the lock state descriptor 200, 220-260 lists are implemented by explicitly passing a state pointer from the calling function to the called one, which allows the implementation of recursive locks and reusable code, but does not allow reentrant locks.

In another embodiment of the invention, the lock descriptor lists 200, 220-260 are implemented by having a per thread stack of descriptors.

In another embodiment, the lock descriptor lists 200, 220-260 are implemented by having a per thread linked list.

In another embodiment, the lock descriptor lists 200, 220-260 are implemented by having a per system linked list.

Advantages of the embodiments above include speed for frame based states, the ability to debug a locking scheme and the ability to detect deadlocks.

In an embodiment of the invention, the switch from one lock state 402-408, or "lock level", to the next state 402-408 is implicit. At each new lock request, if a lock state descriptor 200, 220-260 for the same lock 470 already exists, a new lock state descriptor 200, 220-260 is created. At each release operation, the current state is destroyed, mimicking the behavior of relockable mutexes.

In another embodiment of the invention, the switch from one lock state 402-408 to the next state 402-408 is explicit. In this embodiment, the programmer needs to explicitly declare in which sections of code a further lock 470 attempt is expected on that particular lock 470. The advantage of this embodiment is that a locking scheme has to be explicitly defined and enforced.

In most circumstances programmers use locks 470 in a non reentrant manner and for the shortest amount of time, as per usual multithreading programming tradition. Programmers explicitly turn to a reentrant lock infrastructure for a specific lock 470, only in places where the reentrant use of the lock 470 is completely understood, thereby eliminating the biggest criticism to relockable mutexes.

Figure 6A:
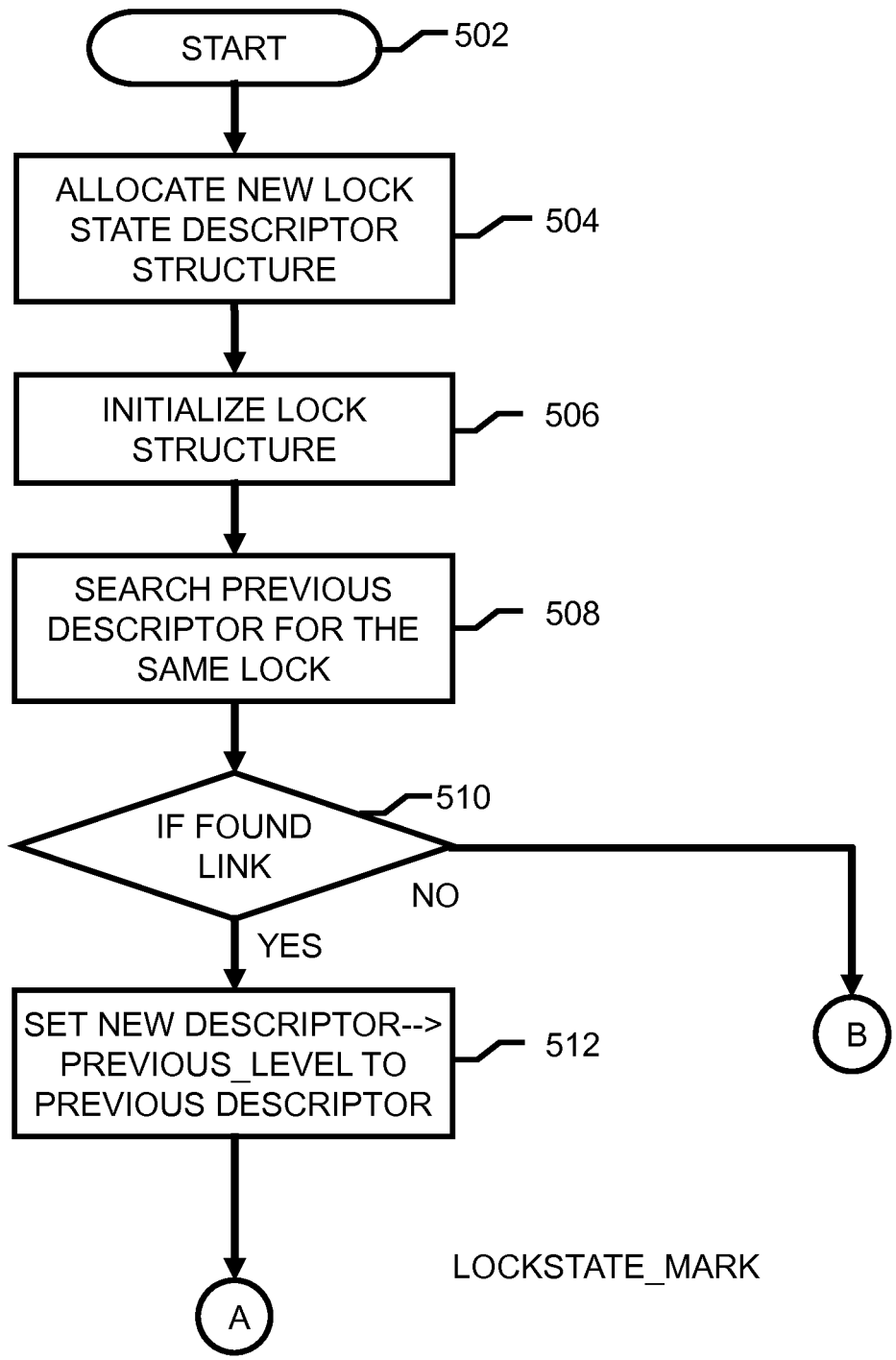
FIGS. 6A and 6B are a flow chart of a process to initialize the lock state descriptor structure of FIG. 3 according to embodiments of the present invention.
Figure 6B:
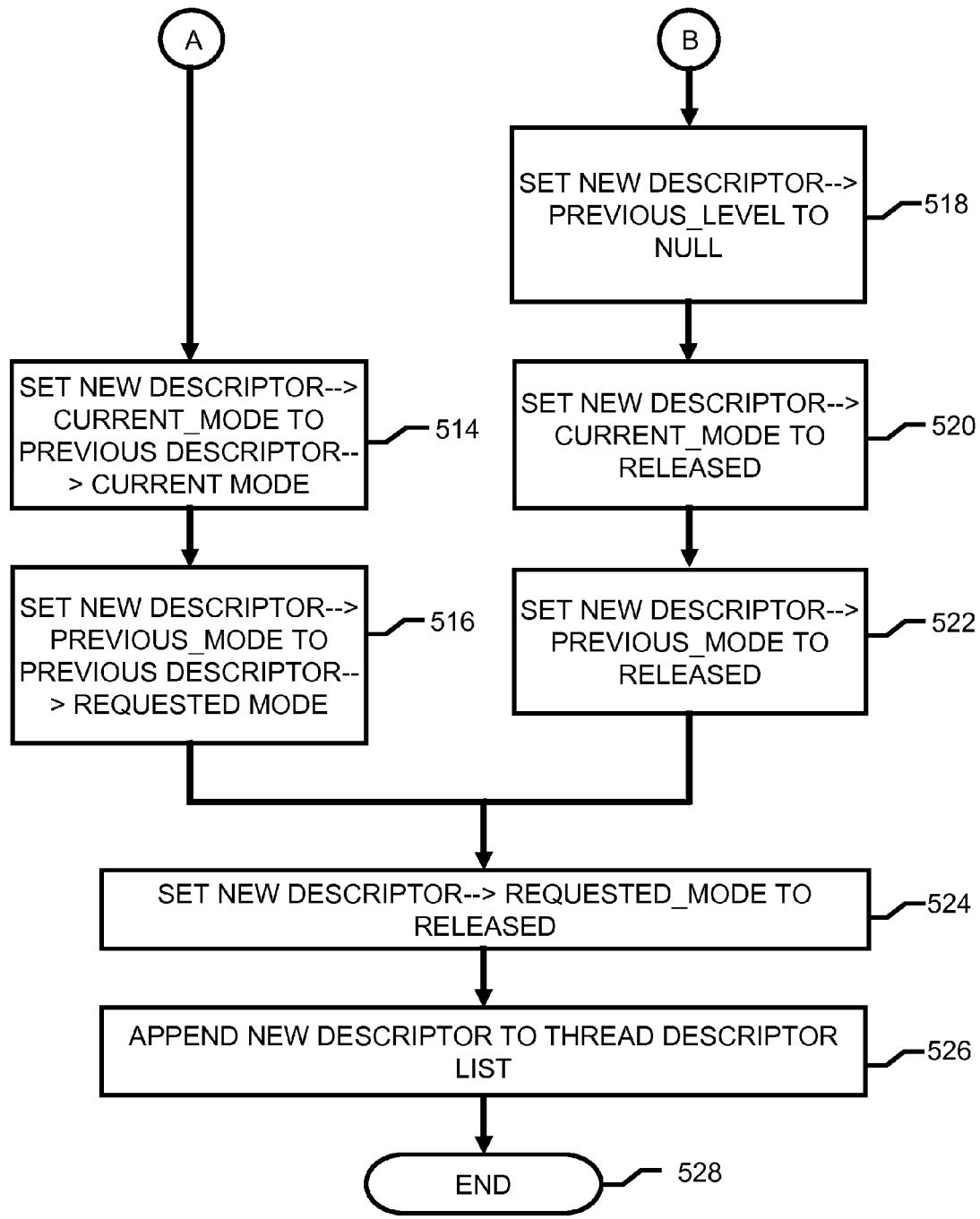

FIGS. 6A and 6B are a flow chart of a process to initialize the lock state descriptor 200 structure of FIG. 3 according to embodiments of the present invention. The exemplary embodiment of FIGS. 6A and 6B are just one of many possible embodiments of the invention as defined by the claims of the invention. The process of FIGS. 6A and 6B, called lockstate_mark, marks a new lock 470 state level. The lock 470 can be acquired by the owner multiple times (or levels) in the same way as known recursive/relockable mutexes do. Unlike in known recursive/relockable mutexes, there is an explicit switch between levels, described later with reference to FIGS. 8A to 8I.

Figure 7A:
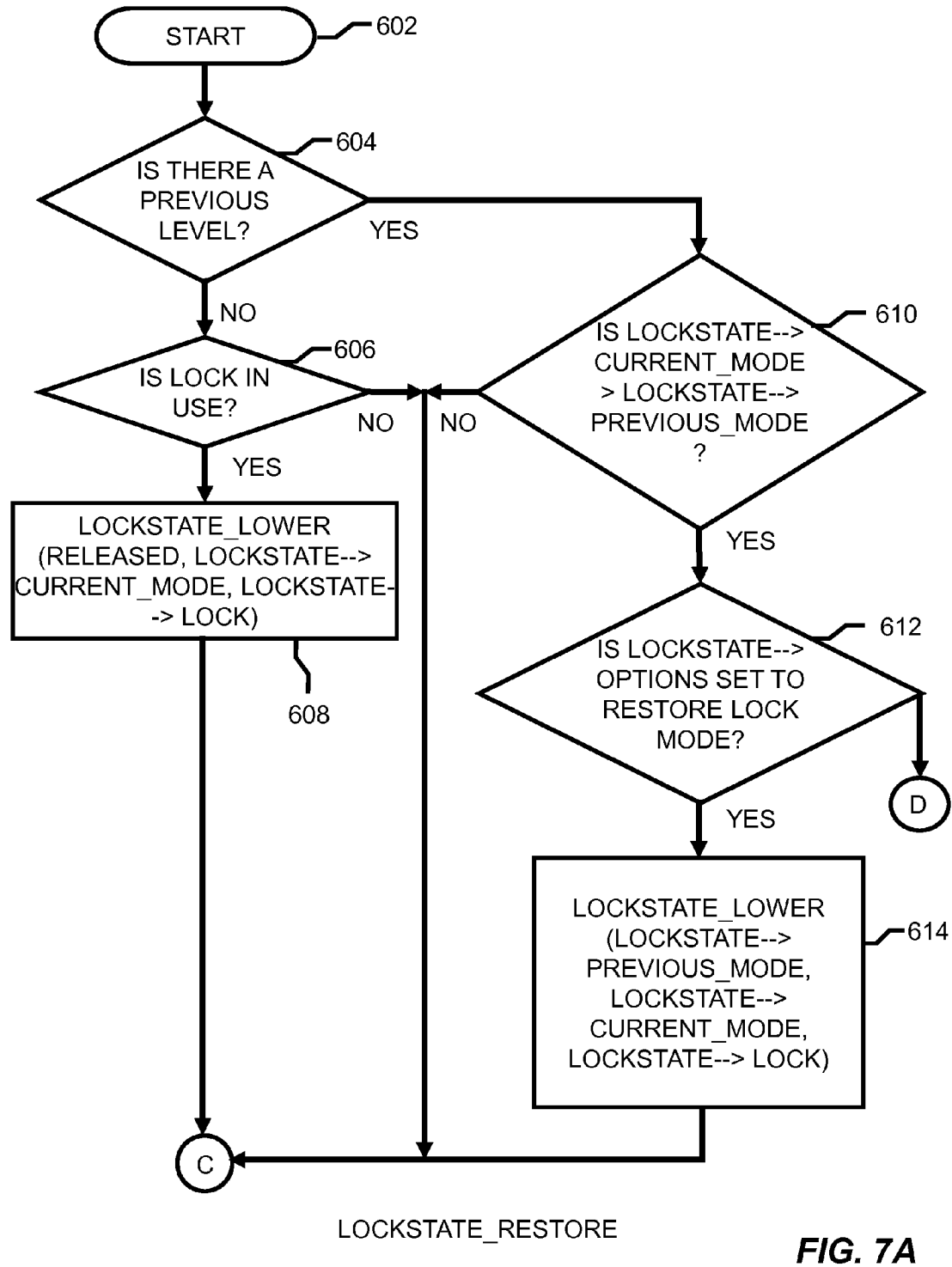
FIGS. 7A and 7B are a flow chart of a process to restore the lock state descriptor structure of FIG. 3.
Figure 7B:
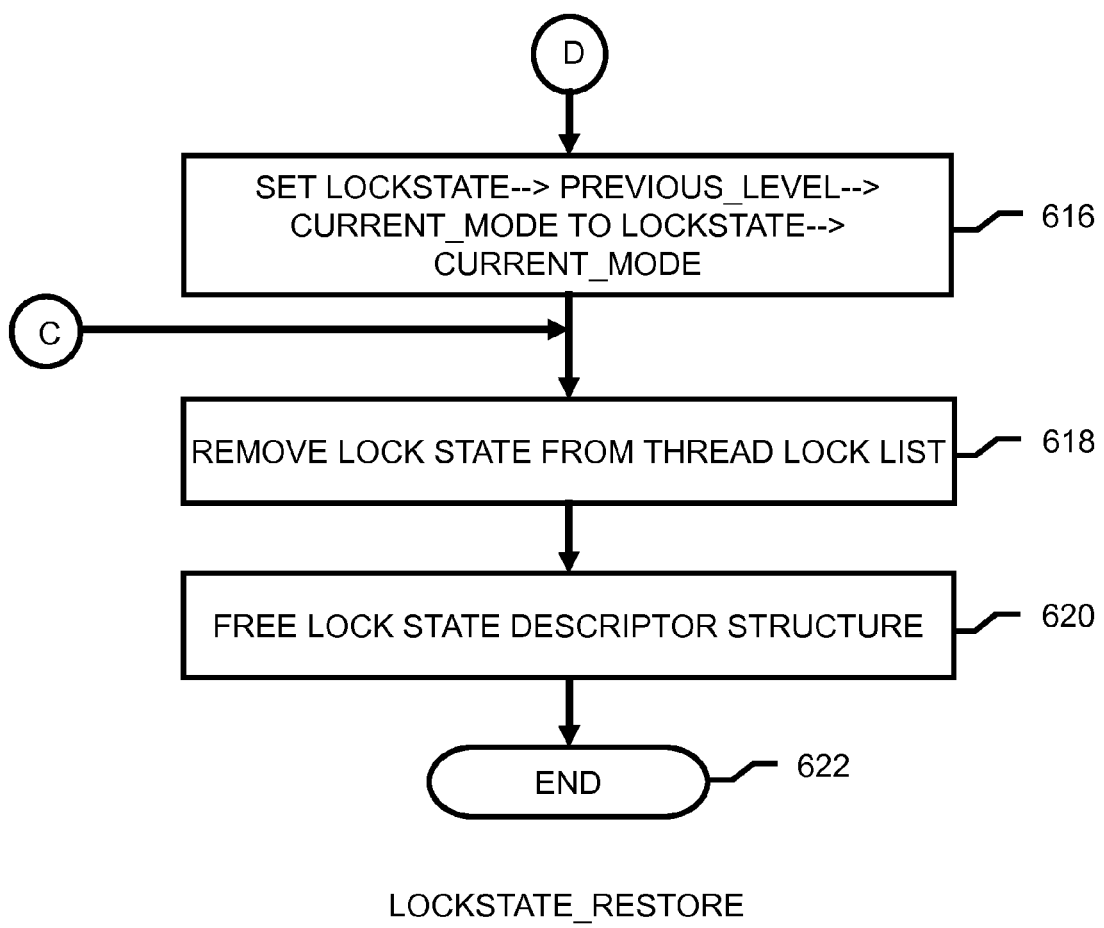

FIGS. 6A and 6B will now be described in more detail by means of the pseudocode below. In an exemplary usage, the lockstate_mark process initiates a first lock level, where the thread 450-456 does not own the lock 470. In the pseudocode examples below, references in < angle brackets > are references to the Figures of the drawings, numbers at the start of each line are references to the corresponding reference numerals in the drawings and references in angle brackets to connectors are references to inter-page connectors in the drawings.

lockstate_mark(int options, int id, lock_t*lock):==
    <Figure 6A>
    504—allocate new lock state descriptor structure
    506—initialize lock structure
    508—search previous descriptor for the same lock
    510—if found link
    <corresponding else is through connector B at line 518 in FIG. 6B>
    512—set new descriplor->previous_level to previous descriptor
    <connector A to FIG. 6B>
    <FIG. 6B>
    <connector A from FIG. 6A>
    514—set new descriptor->current_mode to previous descriptor->current_mode
    516—set new descriptor->previous_mode to previous descriptor->requested_mode —else
    <connector B from FIG. 6A>
    518—set new descriptor->previous_level to NULL
    520—set new descriptor->current_mode to RELEASED
    522—set new descriptor->previous_mode to RELEASED
    524—set new descriptor->requested_mode to RELEASED
    526—append new descriptor to thread descriptor list FIGS. 7A and 7B are a flow chart of a process to restore the lock state descriptor structure 200, 220-260 of FIG. 3. The exemplary embodiment of FIGS. 7A and 7B are just one of many possible embodiments of the invention as defined by the claims of the invention. The process of FIGS. 7A and 7B, called lockstate_restore, terminates the current lock level and sets the lock 470 back as the previous lock level expects it to be. If this process is carried out on the first lock level, then the lock is released.

FIGS. 7A and 7B will now be described in more detail by means of the pseudocode below.

```
lockstate_restore(state_t *lockstate):==
< Figure 7A >
  604   -- if there isn't a previous level
        <corresponding else is at line 610 >
  606       -- if the lock is in use < if not line 618( through connector C
to Figure 7B) >
  608           -- lockstate_lower(RELEASED, lockstate->current_mode,
lockstate->lock)
        -- else
        < connector C to Figure 7B >
  610       -- if lockstate->current_mode > lockstate->previous_mode <
if not line 618 (through connector C to Figure 7B) >
  612           -- if lockstate->options is set to restore lock mode < if not
line 616 (through connector D to Figure 7B) >
  614               -- lockstate_lower(lockstate->previous_mode,
lockstate->current_mode, lockstate->lock)
        < connector C to Figure 7B >
            -- else
        <Figure 7B >
        < connector D from Figure 7A >
  616           -- set lockstate->previous_level->current_mode to lockstate-
>current_mode
        < connector C from Figure 7A >
  618       -- remove lock state from thread lock list
  620       -- free lock state descriptor structure
```

FIGS. 8A to 8I are a flow chart of a process to switch between the modes 402-408 of FIG. 2 in the structure of the lock 470 of FIG. 1. The exemplary embodiment of FIGS. 8A to 8I are just one of many possible embodiments of the invention as defined by the claims of the invention. The process of FIGS. 8A to 8I, called lockstate_switch, causes the lock 470 to transition from one state 402-408 to another 402-408 as needed, for example, from RELEASED to EXCLUSIVE terminates the current lock level and sets the lock 470 back as the previous lock level expects it to be. If this process is carried out on the first lock level, then the lock 470 is released.

FIGS. 8A to 8I will now be described in more detail by means of the pseudocode below. In an exemplary usage, lockswitch_switch is used to acquire a lock 470 which the thread does not already own, in an EXCLUSIVE mode.

Figure 8A:
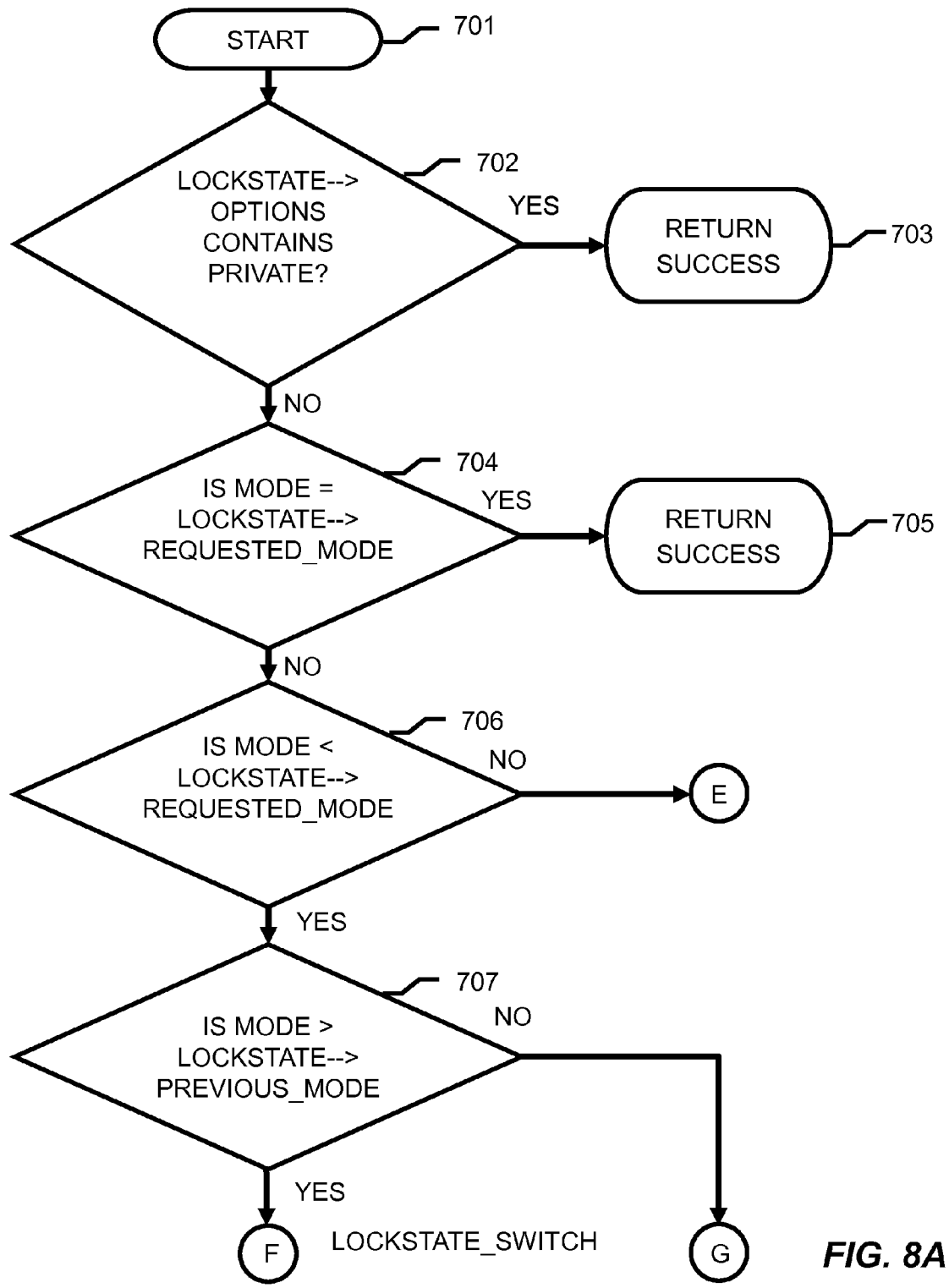
FIGS. 8A to 8I are a flow chart of a process to switch between the modes of FIG. 2 in the structure of the lock of FIG. 1.
Figure 8B:
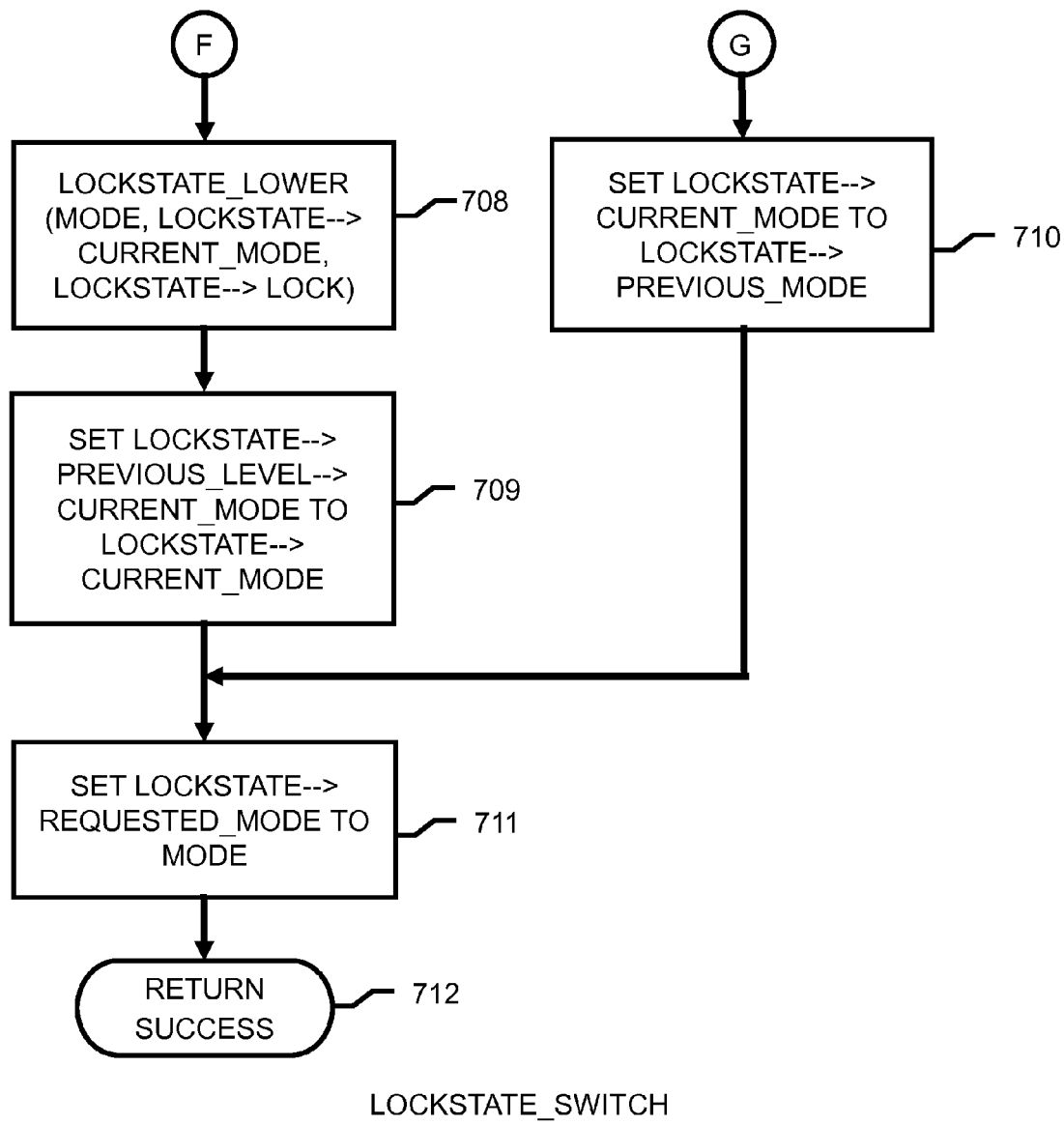
Figure 8C:
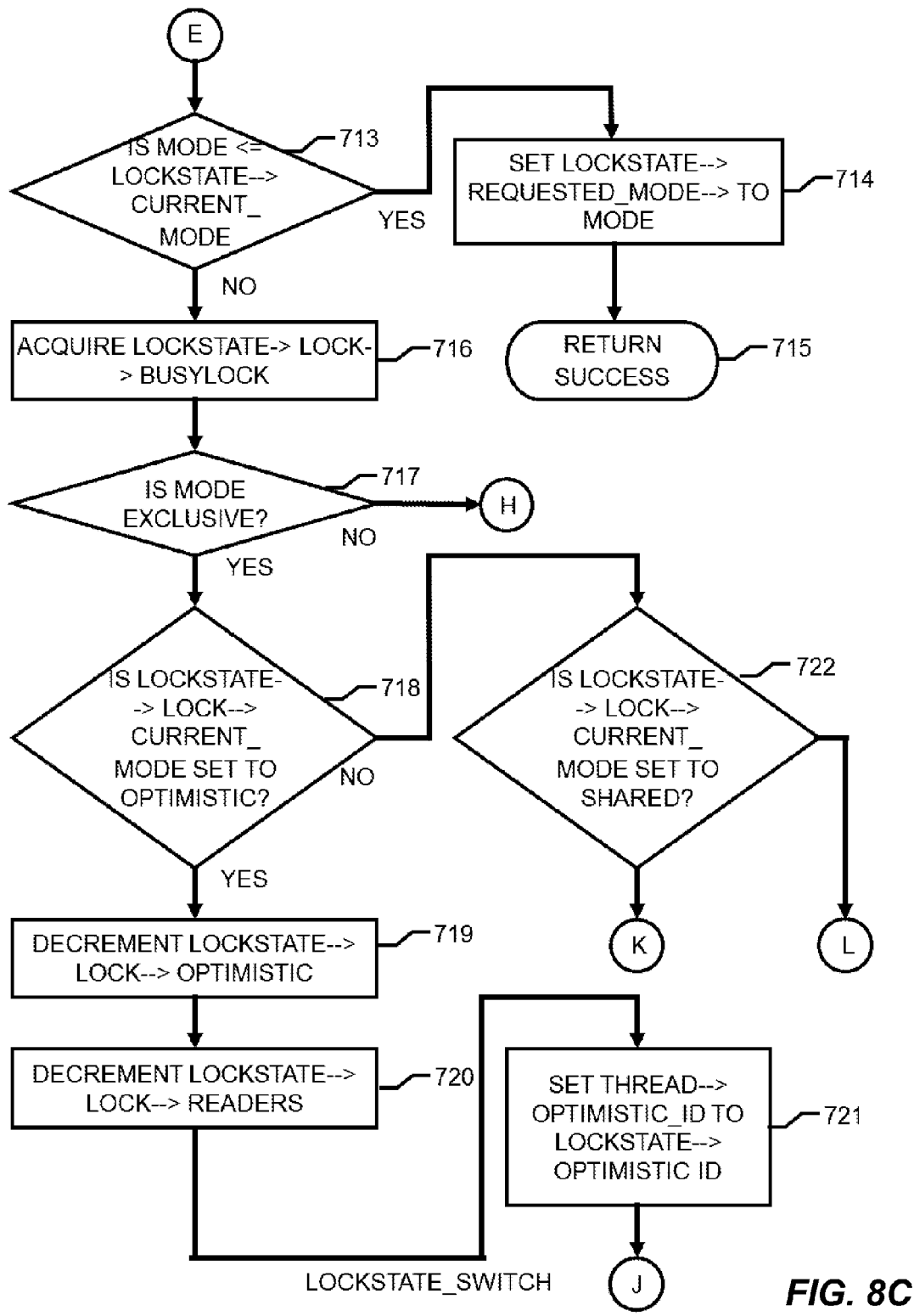
Figure 8D:
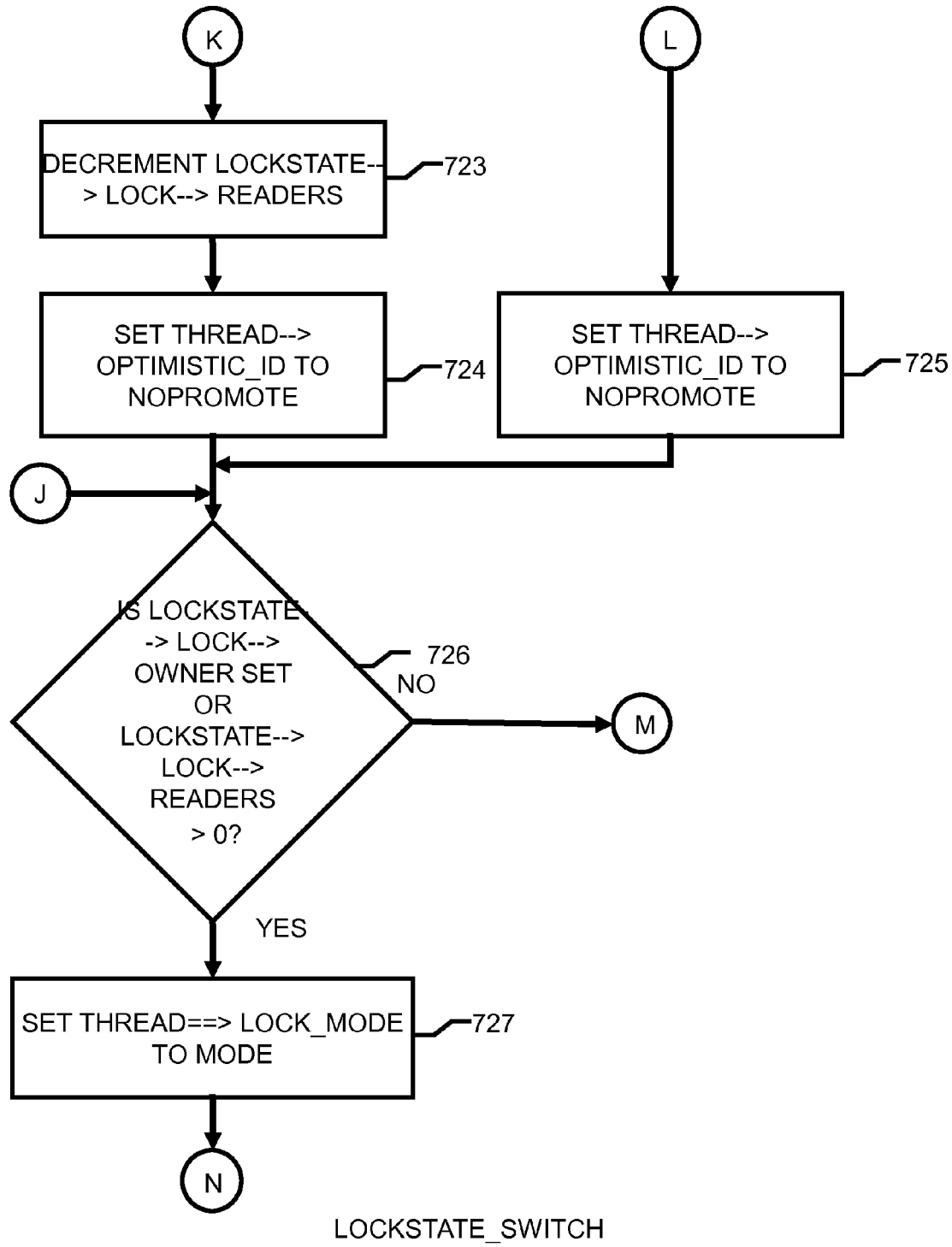
Figure 8E:
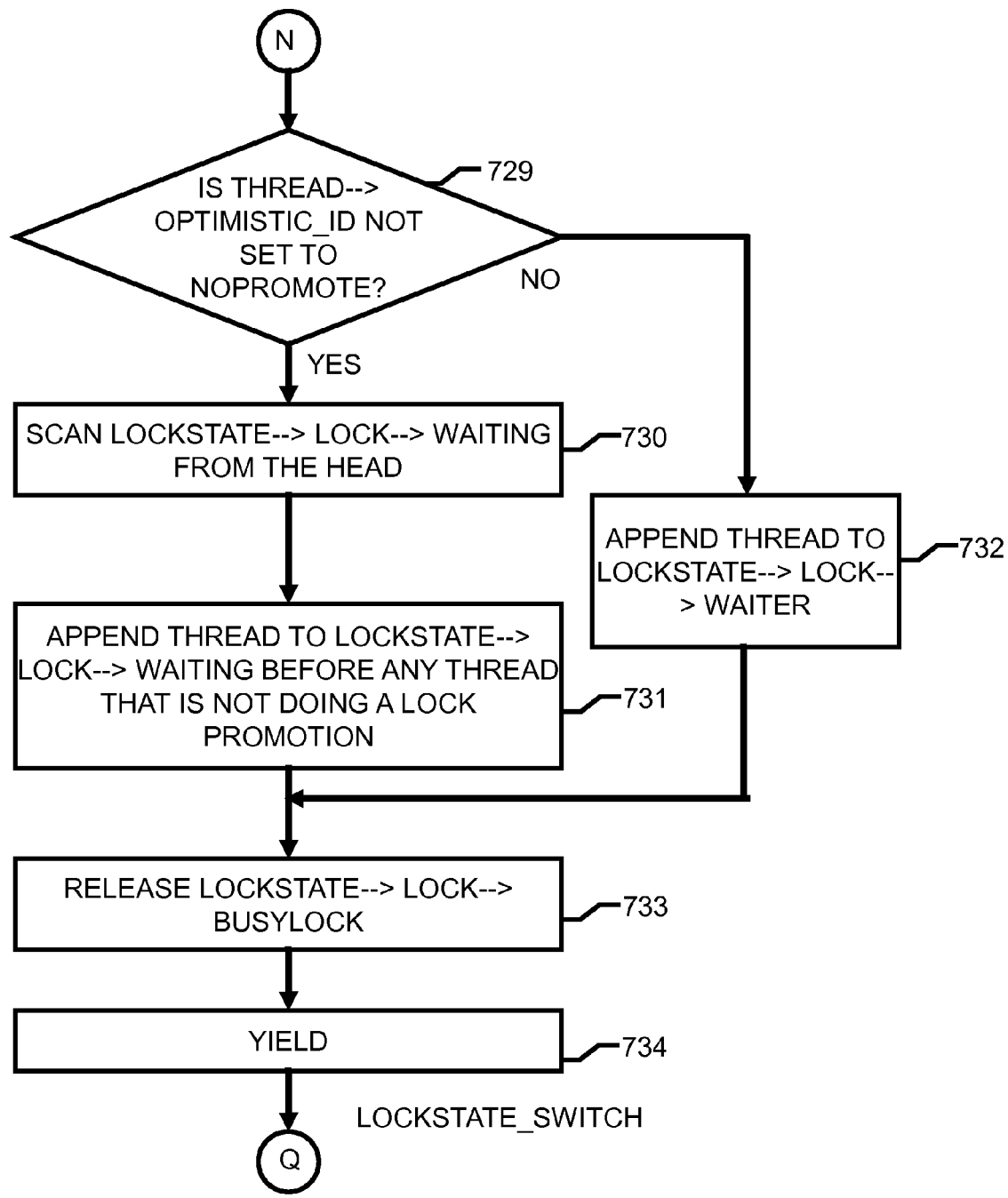
Figure 8F:
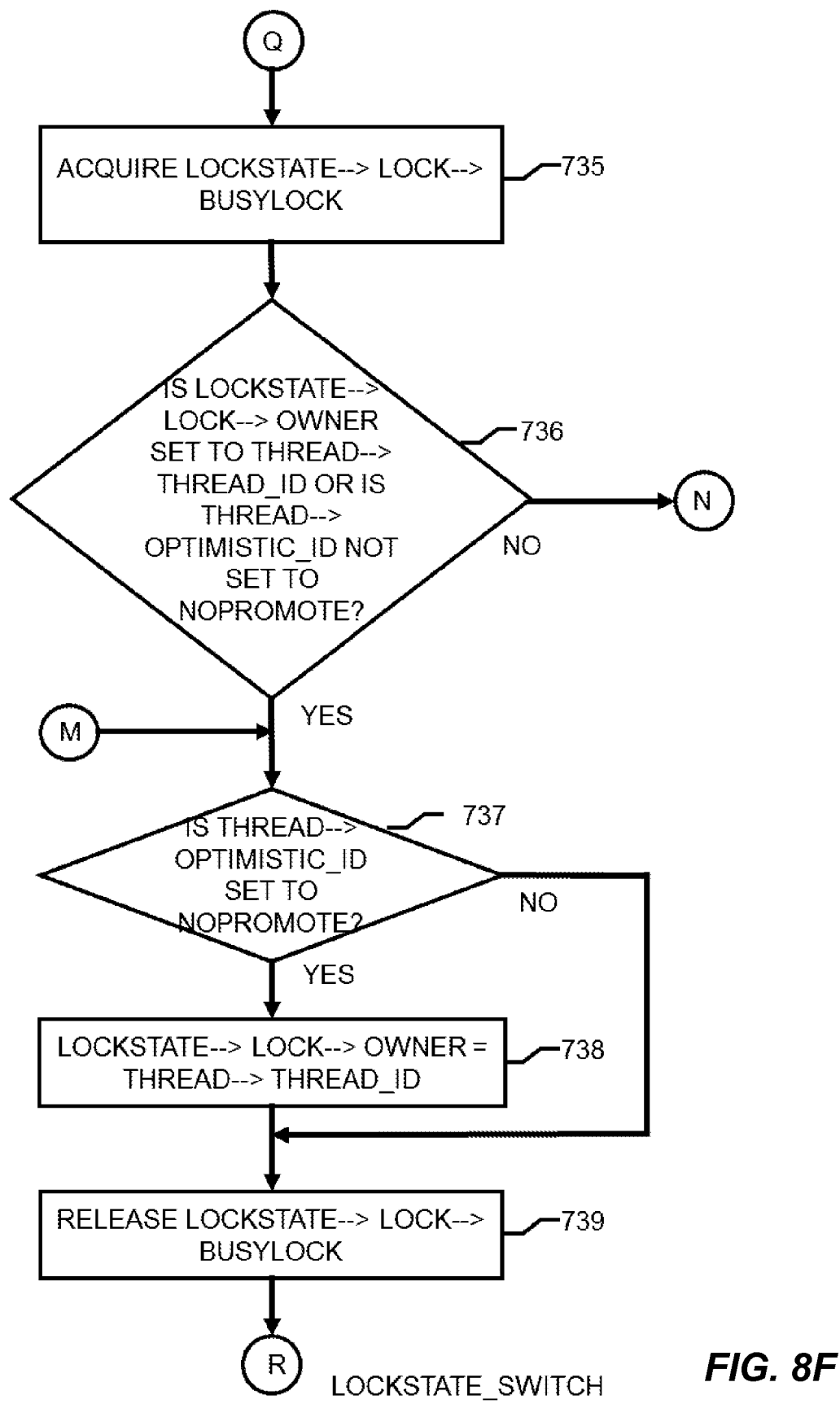
Figure 8G:
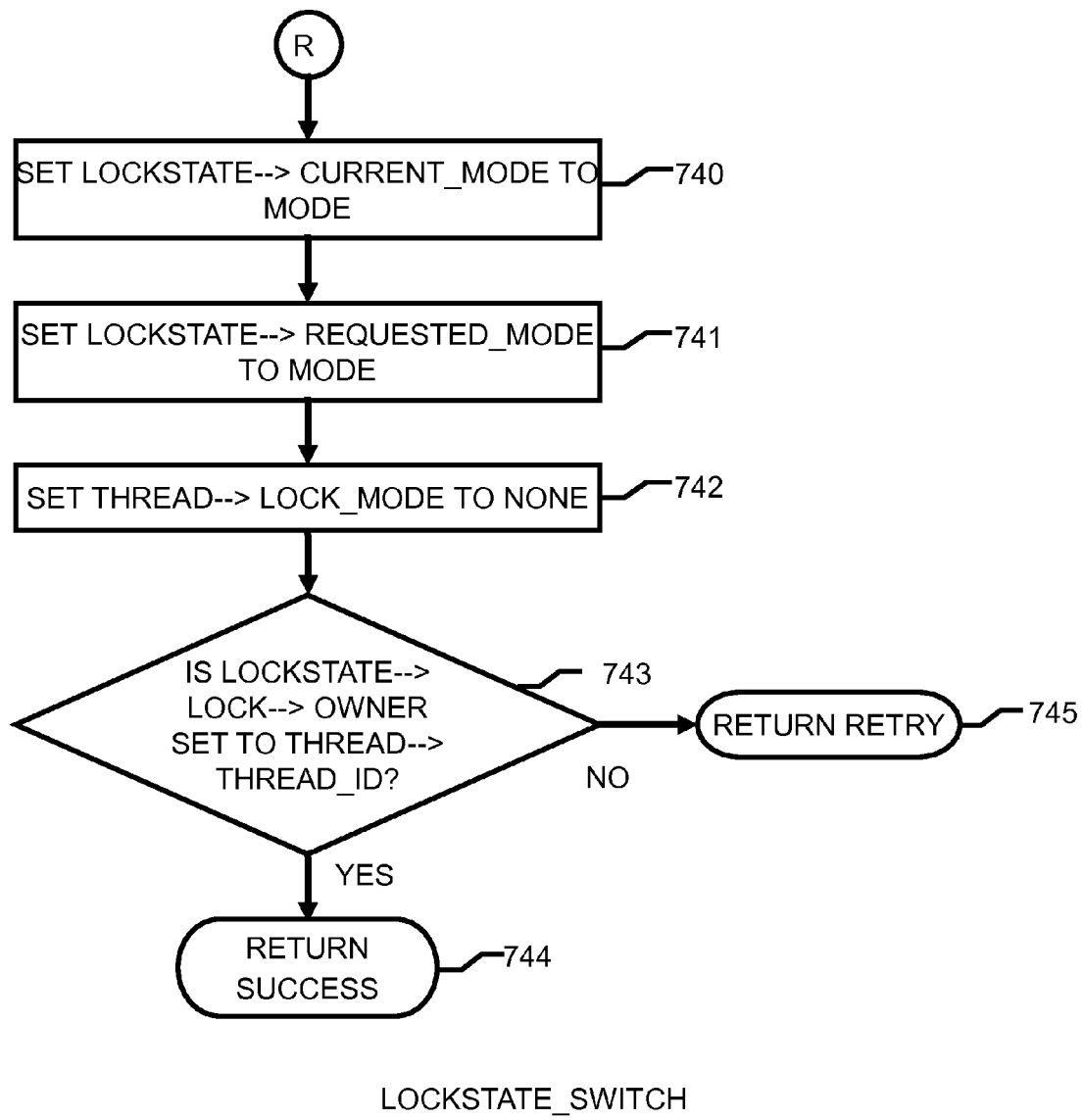
Figure 8H:
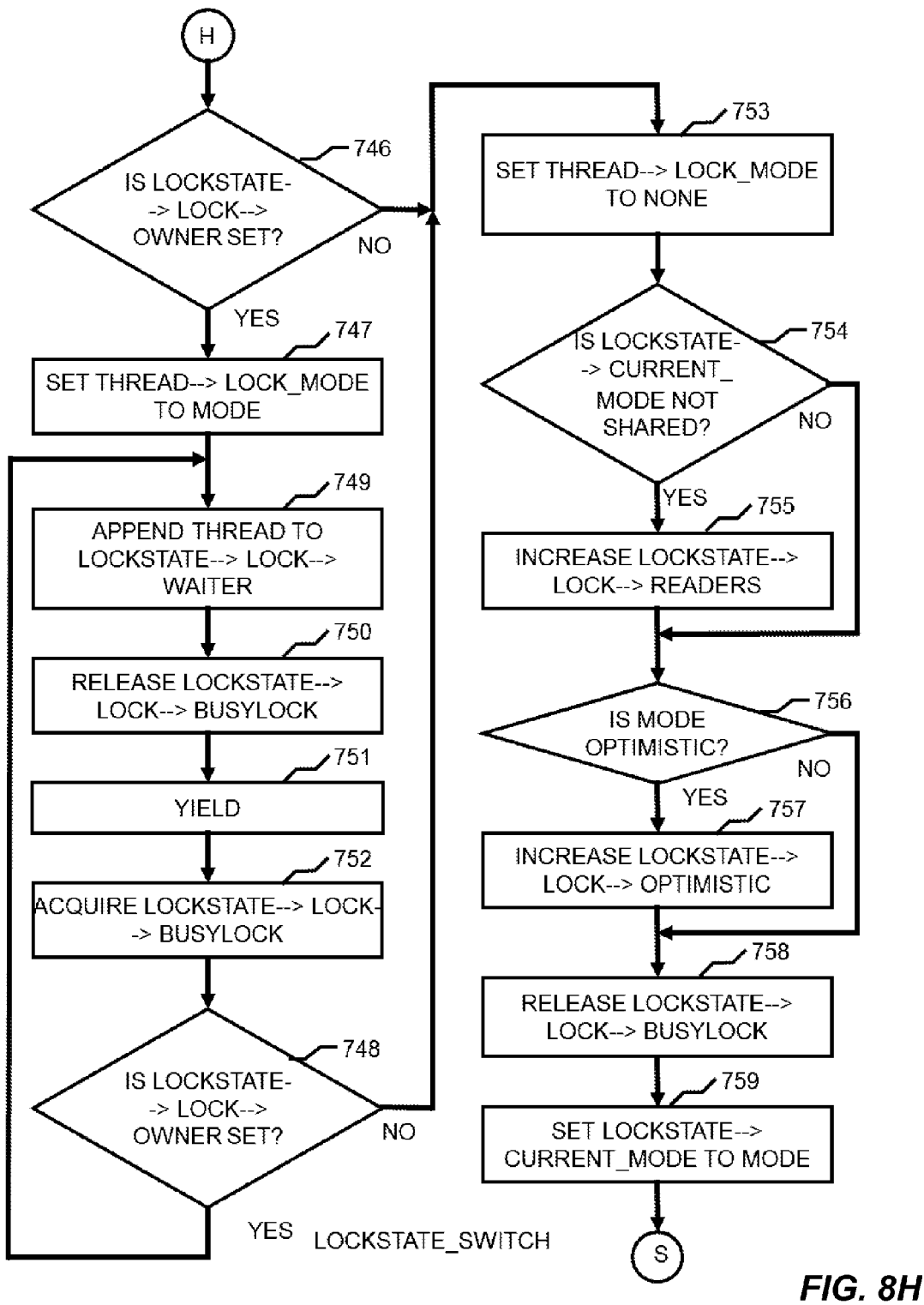

```
lockstate_switch(int mode, state_t *lockstate):==
Figure 8A >
  702   -- if lockstate->options contains PRIVATE
  703       -- return SUCCESS
  704   -- if mode is equal to lockstate->requested_mode
  705       -- return SUCCESS
  706   -- if mode < lockstate->requested_mode
        < corresponding else is at line 13 (through connector E to Figure 8C)
>
  707       -- if mode > lockstate->previous_mode
        < corresponding else is at line 9 (through connector G to Figure 8B)
>
  < connector F to Figure 8B >
  < Figure 8B >
  <connector F from Figure 8A >
  708       -- lockstate_lower(mode, lockstate->current_mode)
  709       -- set lockstate->current_ mode to mode
  <connector G from Figure 8A >
        -- else
  710       -- set lockstate->current_mode to lockstate->previous_mode
  711       -- set lockstate->requested_mode to mode
  712       -- return SUCCESS
  < Figure 8C >
  < connector E from Figure 8A >
  713   -- if mode <= lockstate->current_mode
        < corresponding else is at line 716 >
  714       -- set lockstate->requested_mode to mode
  715       -- return SUCCESS
        -- else
  716   -- acquire lockstate->lock->busylock
  717   -- if mode is EXCLUSIVE
        < corresponding else is at line 746 in Figure 8H (through connector
H) >
  718       -- if lockstate->lock->current_mode is set to OPTIMISTIC
        < corresponding else is at line 722 >
  719           -- decrement lockstate->lock->optimistic
  720           -- decrement lockstate->lock->readers
  721           -- set thread->optimistic_id to lockstate->optimistic_id
  < connector J to Figure 8D >
  722       -- else if lockstate->lock->current_mode is set to SHARED
        < corresponding else is at line 725 (through connector L
        to Figure 8D) >
  < connector K to Figure 8D >
  < Figure 8D >
  < connector K from Figure 8C >
  723           -- decrement lockstate->lock->readers
  724           -- set thread->optimistic_id to NOPROMOTE
  < connector L from Figure 8C >
            -- else
  725           -- set thread->optimistic_id to NOPROMOTE
  726       -- if lockstate->lock->owner is set or lockstate->lock->readers >
0
  < connector J from Figure 8C >
        < else continue to line 737 in Figure 8F (connector M) >
  727           -- set thread->lock_ mode to mode
  < connector N to Figure 8E >
  < Figure 8E >
  < connector N from Figure 8D >
  728           -- do
  729               -- if thread->optimistic_id is not set to NOPROMOTE
                (that is, this is a lock promotion) < corresponding else is at
                line 732 >
  730                   -- scan lockstate->lock->waiting from the head
  731                   -- append thread to lockstate->lock->waiting before any
thread that is not doing a lock promotion
                -- else
  732                   -- append thread to lockstate->lock->waiter
  733               -- release lockstate->lock->busylock
  734               -- yield
  < connector Q to Figure 8F >
  < Figure 8F >
  <connector Q from Figure 8E >
  735               -- acquire lockstate->lock->busylock
  736               -- if lockstate->lock->owner is set to thread->thread_id or
                thread->optimistic_id is not set to NOPROMOTE
                (that is, this is a lock promotion)
                -- break from do - while loop < continue to line 737 >
        -- while lockstate->lock->owner is set or lockstate->lock->
readers > 0 <return to line 728 in Figure 8E (connector N) >
  < connector M from Figure 8E >
  737           -- if thread->optimistic_id is set to NOPROMOTE < if not
then line 739 >
  738               -- lockstate->lock->owner =thread->thread_ id
  739               -- release lockstate->lock->busylock
  < connector R to Figure 8G >
  < Figure 8G >
  < connector R from Figure 8G >
  740           -- set lockstate->current_ mode to mode
  741           -- set lockstate->requested_mode to mode
  742           -- set thread->lock_mode to NONE
  743           -- if lockstate->lock->owner is set to thread->thread_id
                < corresponding else is at line 50 >
  744               -- return SUCCESS
            -- else
  745               -- return RETRY
  <Figure 8H >
  < connector H from Figure 8C >
```

Figure 8I:
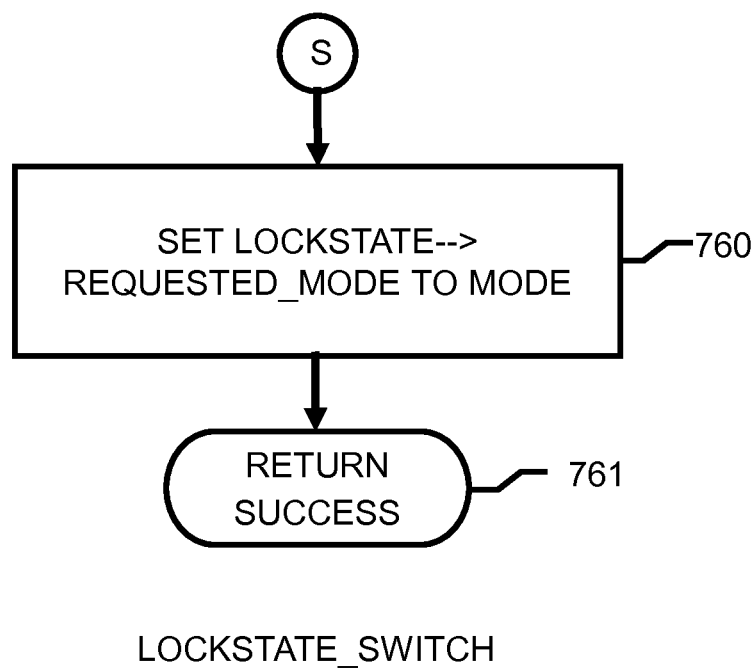

```
       -- else
746    -- if lockstate->lock->owner is set < if not then line 753 >
747       -- set thread->lock_mode to mode
748    -- do
749       -- append thread to lockstate->lock->waiter
750       -- release lockstate->lock->busylock
751       -- yield
752       -- acquire lockstate->lock->busylock
748    -- while lockstate->lock->owner is set < loop back to line
748 while true, otherwise line 753 >
753    -- set thread->lock_mode to NONE
754    -- if lockstate->current_mode is not SHARED < if not then
line 756 >
755       -- increase lockstate->lock->readers
756       -- if mode is OPTIMISTIC < if not then line 758 >
757          -- increase lockstate->lock->optimistic
758       -- release lockstate->lock->busylock
759       -- set lockstate->current_mode to mode
< connector S to Figure 8I >
< Figure 8I >
< connector S from Figure 8H >
760    -- set lockstate->requested_mode to mode
761    -- return SUCCESS
```

FIGS. 9A to 9H are a flow chart of a process to lower the mode of the structure 100 of the lock 470 of FIG. 1. The exemplary embodiment of FIGS. 9A to 9H are just one of many possible embodiments of the invention as defined by the claims of the invention. The process of FIGS. 9A to 9H, called lockstate_lower, is a helper function, used only by the lockstate_switch( ) and lockstate_restore( ) processes to cause the lock 470 to transition from a state 402-408 to a lower state 402-408.

FIGS. 9A to 9H will now be described in more detail by means of the pseudocode below.

Figure 9A:
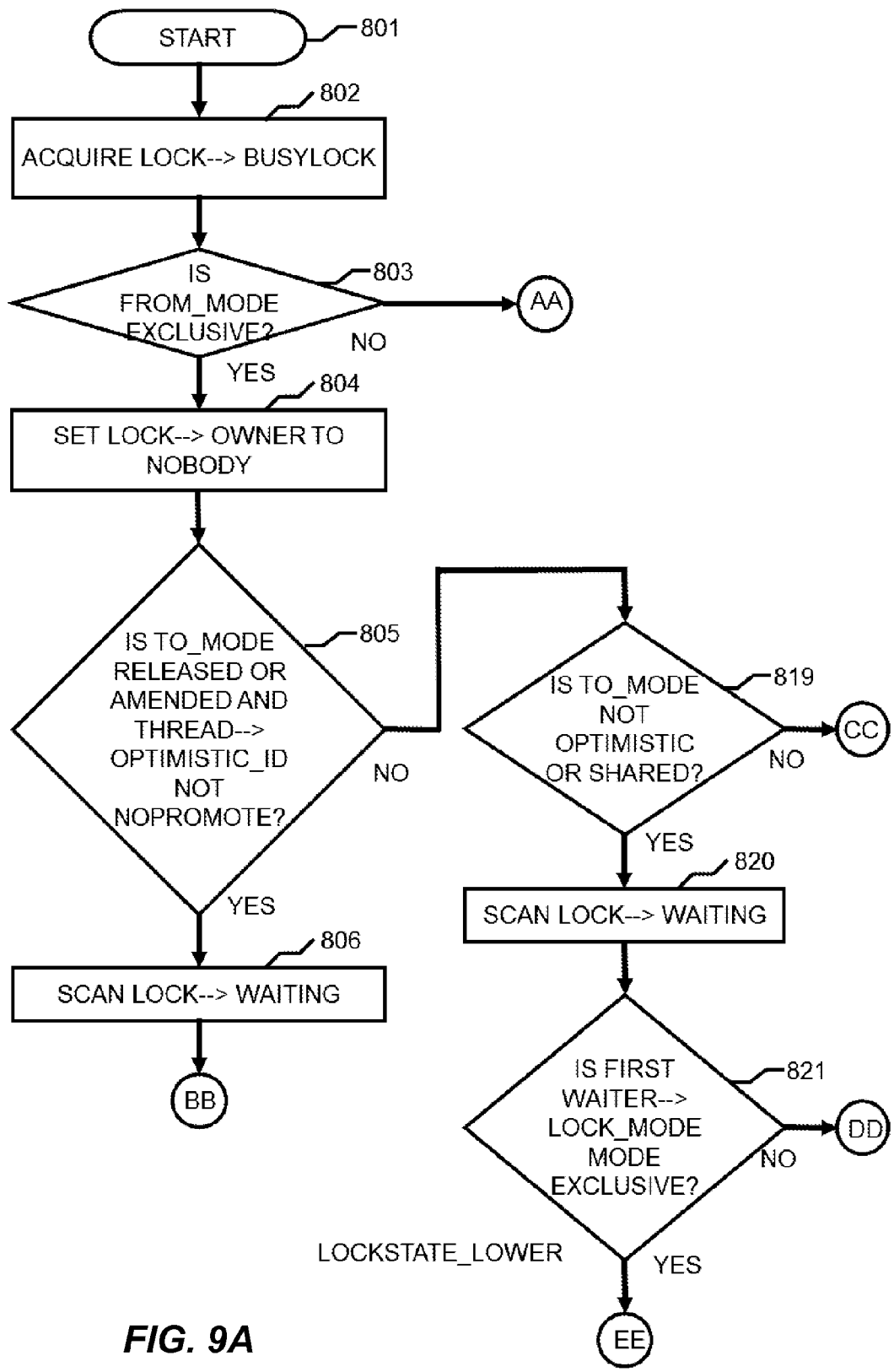
FIGS. 9A to 9H are a flow chart of a process to lower the mode of the structure of the lock of FIG. 1.
Figure 9B:
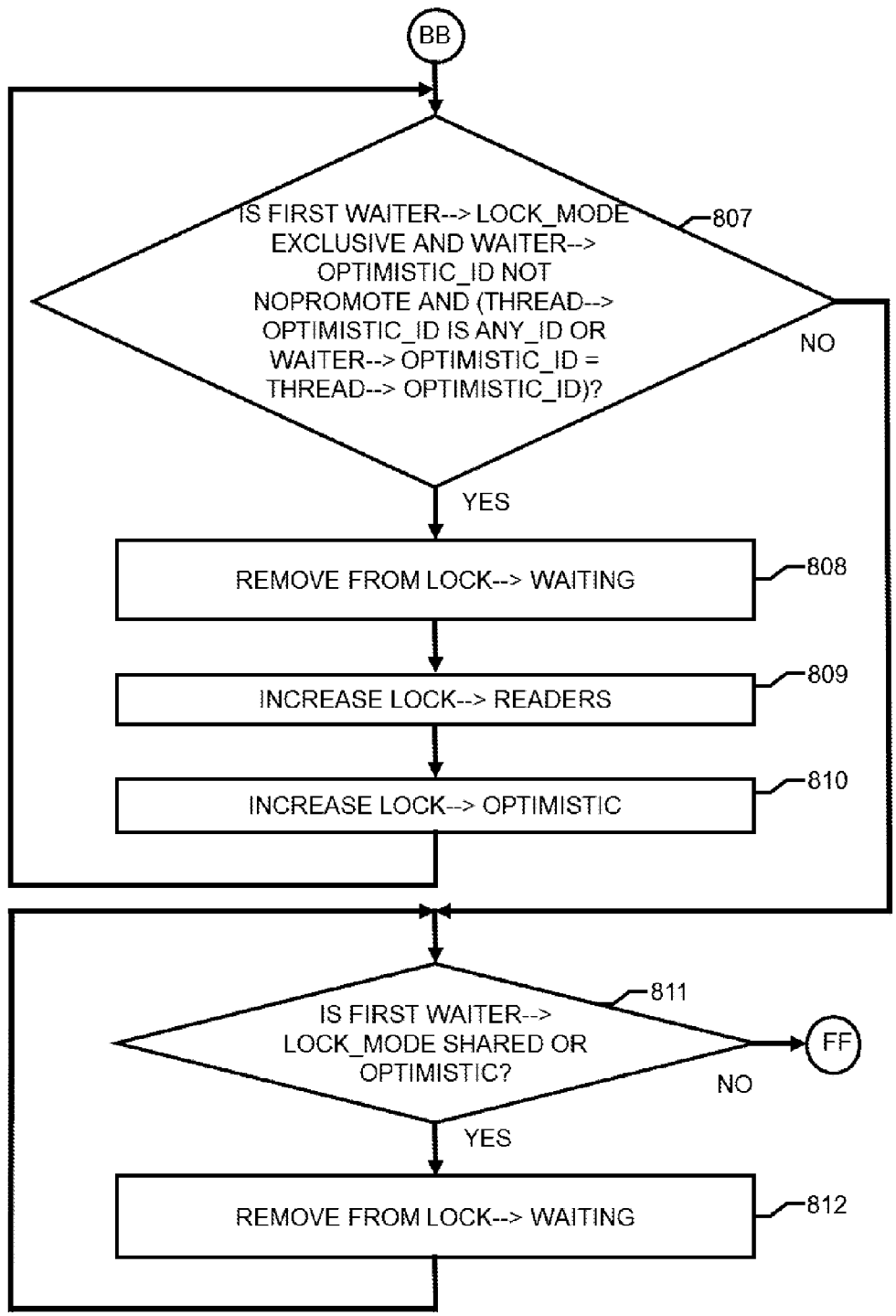
Figure 9C:
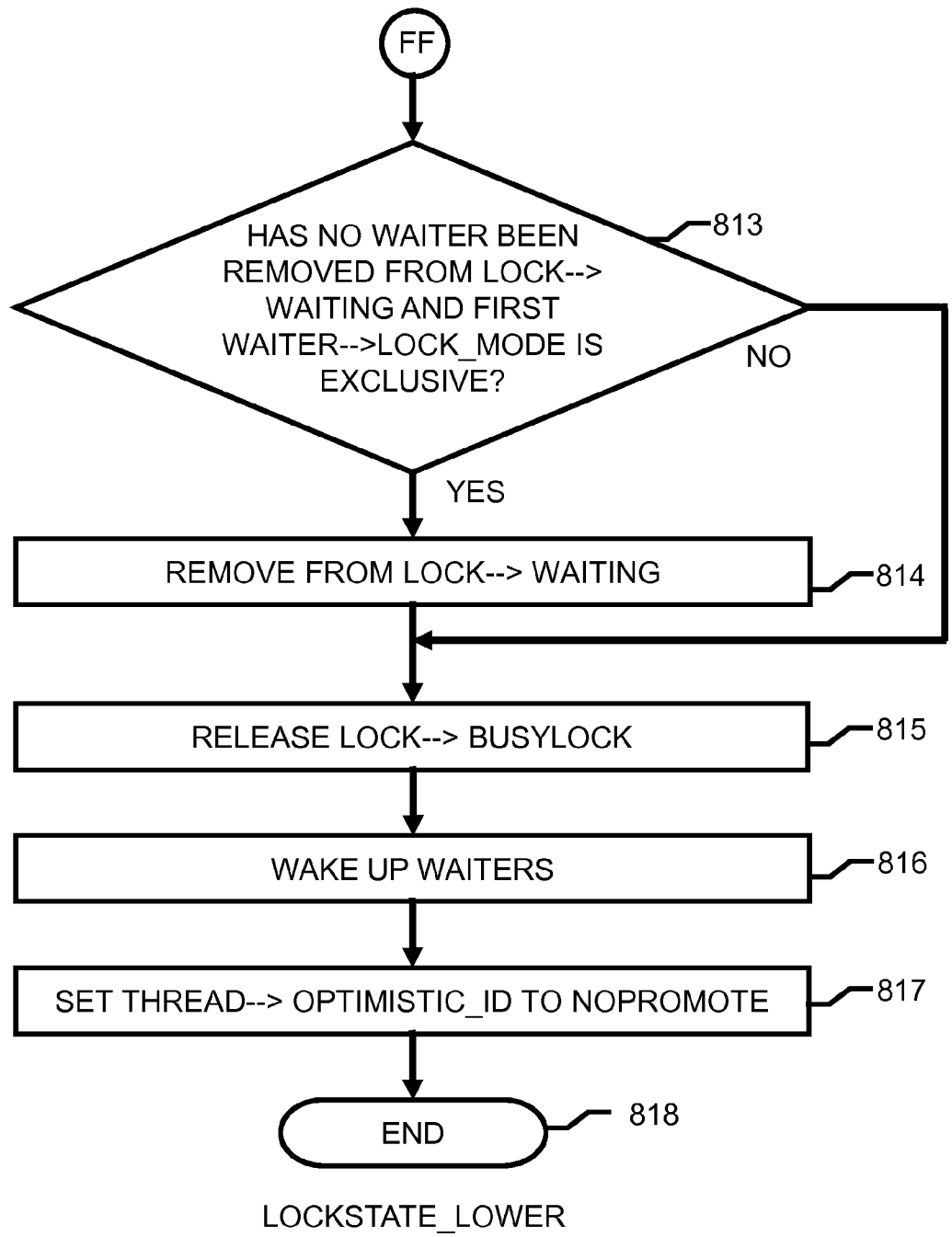
Figure 9D:
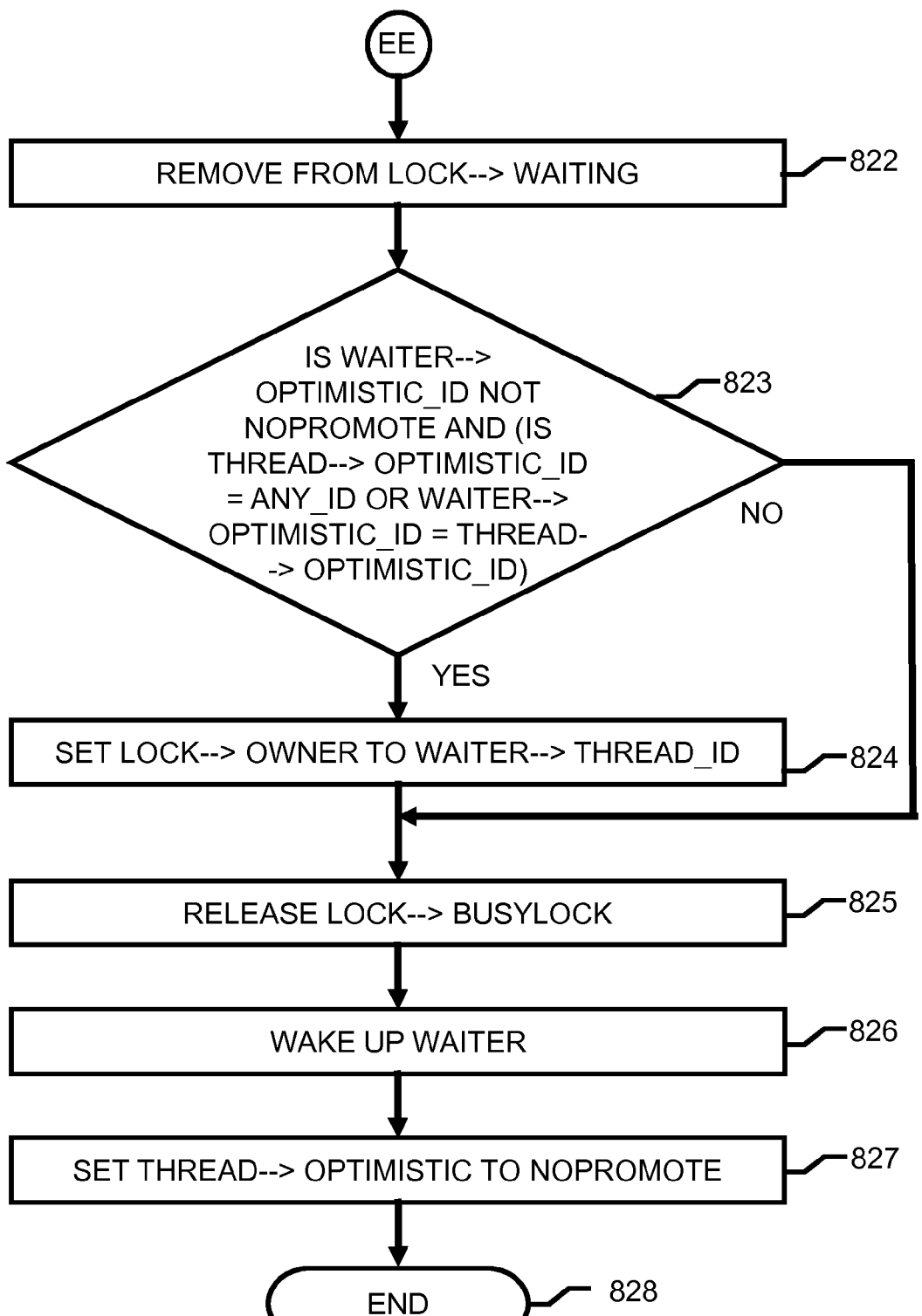
Figure 9E:
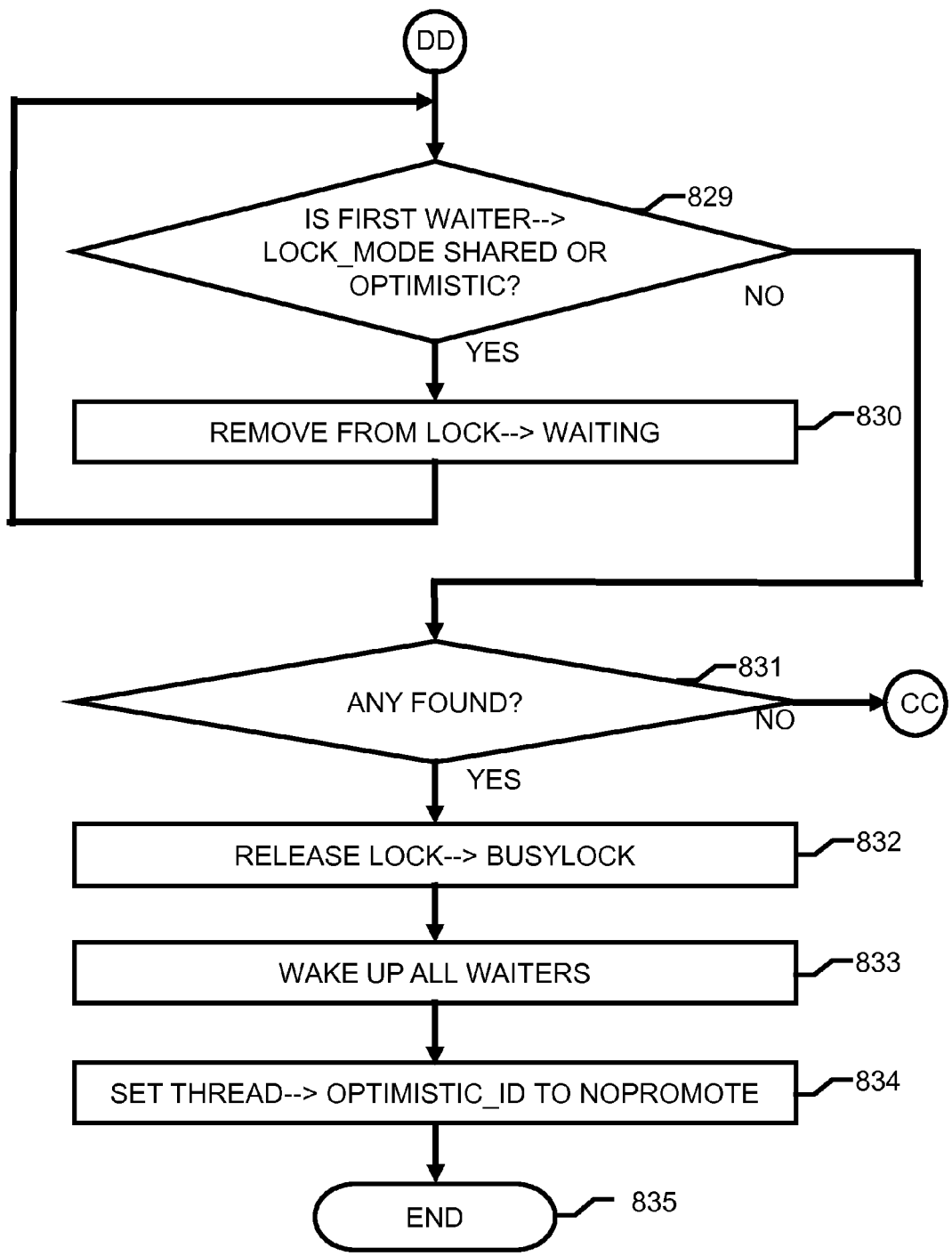
Figure 9F:
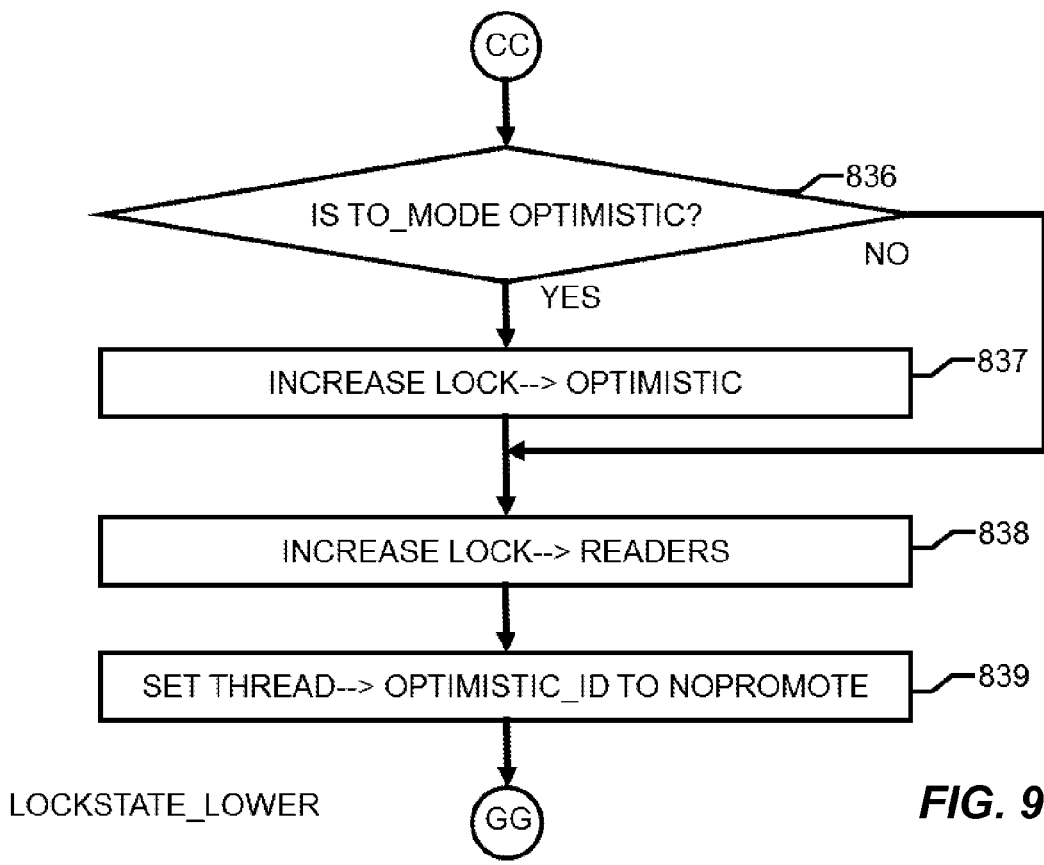
Figure 9G:
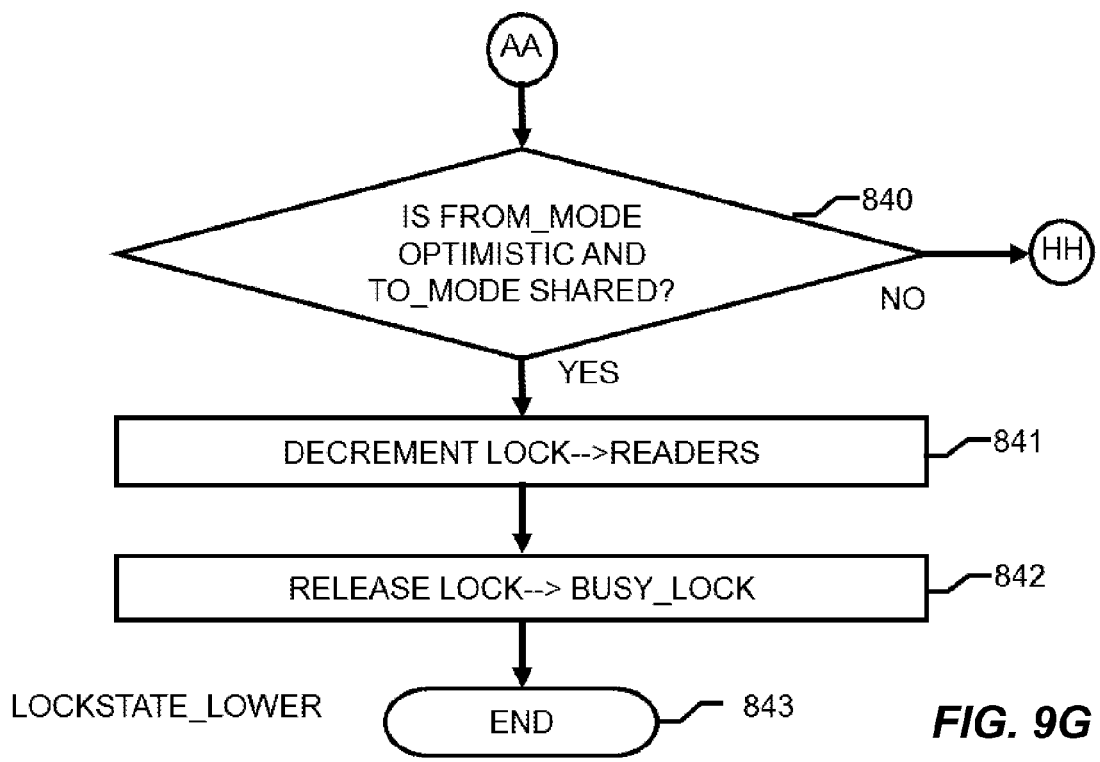
Figure 9H:
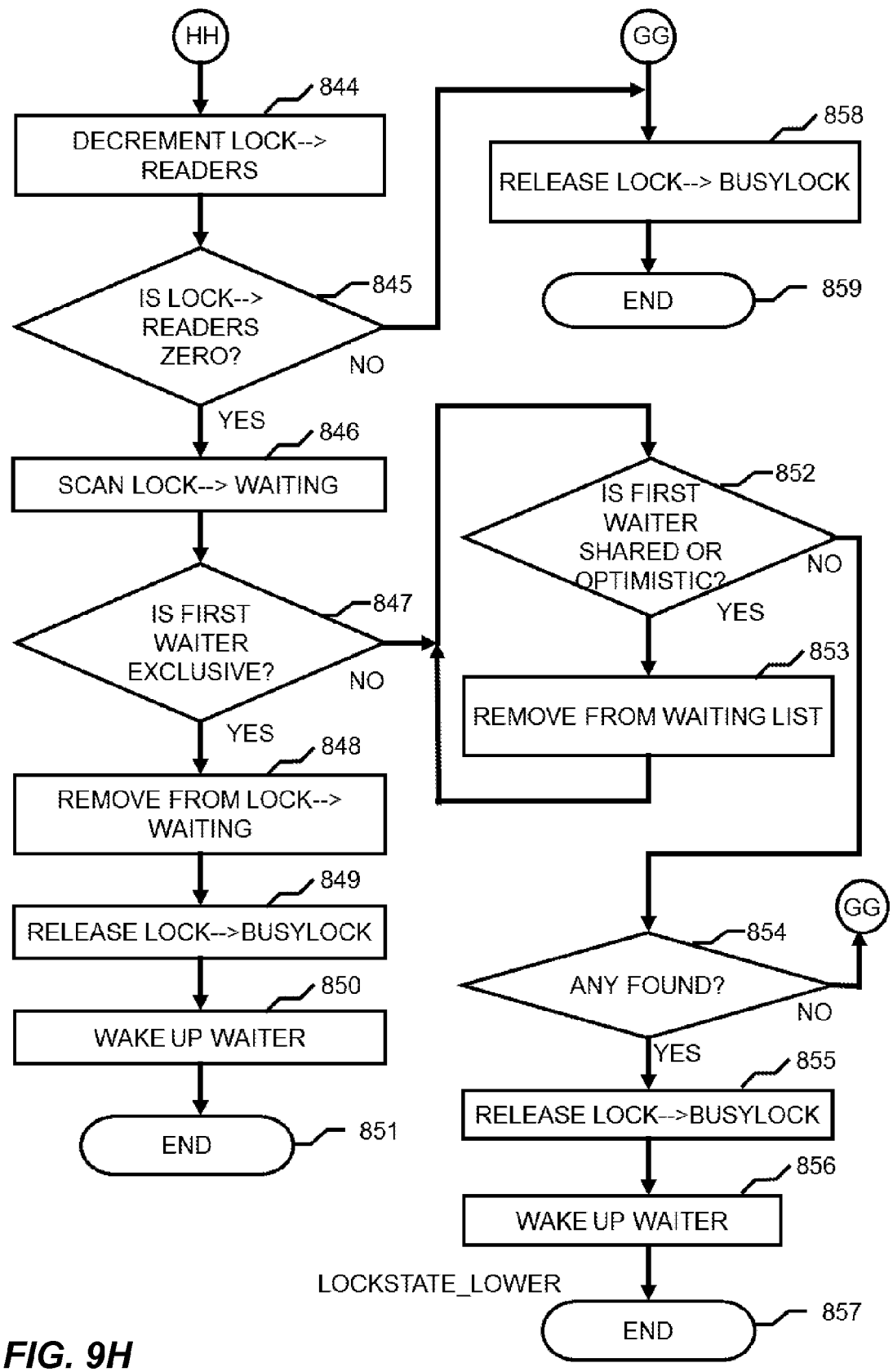

```
lockstate_lower(int to_mode, int from_mode, lock_t *lock):==
< Figure 9A >
802    -- acquire lock->busylock
803    -- if from_mode is EXCLUSIVE
       < corresponding else is between line 839 and 840 (through connector
AA to Figure 9G) >
804       -- set lock->owner to NOBODY
805       -- if to_mode is RELEASED or AMENDED and thread->
optimistic_id is not NOPROMOTE
          < corresponding else is at line 819 >
806          -- scan lock->waiting
          < connector BB to Figure 9B >
< Figure 9B >
< connector BB from Figure 9A >
807          -- while first waiter->lock_mode is EXCLUSIVE and
waiter->optimistic_id not NOPROMOTE and
             (thread->optimistic_id is ANY_ID or waiter->optimistic_id
equals thread->optimistic_id)
808             -- remove from lock->waiting
809             -- increase lock->readers
810             -- increase lock->optimistic
811          -- while first waiter->lock_mode is SHARED or OPTIMIS-
TIC
812             -- remove from lock->waiting
< connector FF to Figure 9C>
< Figure 9C >
< connector FF from Figure 9B >
813          -- if no waiter removed from lock->waiting and first
waiter->lock_mode is EXCLUSIVE
814             -- remove from lock->waiting
815             -- release lock->busylock
816             -- wake up waiters
817             -- set thread->optimistic_id to NOPROMOTE
818             -- exit
< Figure 9A >
819       -- else if to_mode is not OPTIMISTIC or SHARED
          < corresponding else is at line 836 (through connector CC
to Figure 9F) >
820          -- scan lock->waiting
821          -- if first waiter->lock_mode is EXCLUSIVE
             < corresponding else is at line 829 (through connector DD
to Figure 9E) >
< connector EE to Figure 9D >
< Figure 9D >
< connector EE from Figure 9A >
822             -- remove from lock->waiting
             /* enforce optimistic lock promotion after a PRESERVE */
823             -- if waiter->optimistic_id is not NOPROMOTE and
                (thread->optimistic_id is ANY_ID or waiter->optimistic_id
equals thread->optimistic_id)
824                -- set lock->owner to waiter->thread_id
825                -- release lock->busylock
826                -- wake up waiter
827                -- set thread->optimistic_id to NOPROMOTE
828                -- exit
< Figure 9E >
< connector DD from Figure 9A >
          -- else
829             -- while first waiter->lock_mode is SHARED or
OPTIMISTIC
830                -- remove from lock->waiting
831             -- if any found < if not line 836 (through connector CC to
Figure 9F) >
832                -- release lock->busylock
833                -- wake up all waiters
834                -- set thread->optimistic_id to NOPROMOTE
835                -- exit
          -- else
< Figure 9F >
< connector CC from Figures 9A and 9E >
          /* EXCLUSIVE to OPTIMISTIC should be avoided
             as this means that any subsequent optimistic promoter will not
retry */
836          -- if to_mode is OPTIMISTIC
837             -- increase lock->optimistic
838             -- increase lock->readers
839             -- set thread->optimistic_id to NOPROMOTE
< connector GG to Figure 9H >
< Figure 9G >
< connector AA from Figure 9A >
          -- else
840       -- if from_mode is OPTMISTIC and to_mode is SHARED < if
not line 844 (through connector HH to Figure 9H) >
841          -- decrement lock->readers
842          -- release lock->busy_lock
843          -- exit
< Figure 9H >
< connector HH from Figure 9G >
844       -- decrement lock->readers
845       -- if lock->readers is zero < if not line 858 >
846          -- scan lock->waiting
847          -- if first waiter is EXCLUSIVE
             < corresponding else is at line 852 >
848             -- remove from lock->waiting
849             -- release lock->busylock
850             -- wake up waiter
851             -- exit
          --else
852             -- while first waiter is SHARED or OPTIMISTIC
853                --remove from waiting list
854             -- if any found
855                -- release lock->busylock
856                -- wake up all waiters
857                -- exit
858       -- release lock->busylock
859       -- exit
```

In a computer-implemented method for managing access to a shareable resource between a plurality of concurrently executing threads, access to said shareable resource being controlled by a lock, said lock being adapted to be accessed by one or more of said plurality of concurrently executing threads in at least a shared mode, an optimistic mode and an exclusive mode and said lock maintaining a list of threads requesting ownership of said lock, the method comprising: providing a shared optimistic mode for said lock, said lock being acquirable in said shared optimistic mode by one or more of said plurality of concurrently executing threads; providing, for each change of mode desired by one of said concurrently executing threads, a lock state descriptor, said lock state descriptor comprising an indication of the current mode, if any, in which said one of said concurrently executing threads has already acquired said lock; responsive to said one or more of the concurrently executing threads acquiring said lock in said shared optimistic mode, allowing others of said one or more concurrent threads to acquire said lock in said shared mode or said optimistic mode; and responsive to said one or more of the concurrently executing threads which has acquired said lock in said shared optimistic mode requesting to acquire said lock in said exclusive mode, preventing others of said one or more of the concurrently executing threads which have acquired said lock in said shared mode or said optimistic mode from acquiring said lock in said exclusive mode until said one or more of the concurrently executing threads which has acquired said lock in said shared optimistic mode requesting to acquire said lock in said exclusive mode releases said lock.

In a specific embodiment of the invention, an identifier is associated to an optimistic lock request. Using the identifier, rather than waking up all of the optimistic lock promoters, upon releasing the lock, the current lock owner can wake up only requesters that have used the same identifier as the lock owner. All such lock requesters would be going through the same section of code. This allows the release of just threads waiting on the particular substructure that has just been amended, but not threads waiting on other substructures, which are still outdated, thereby avoiding further contention.

In a computer-implemented method, each request for a change of mode to said optimistic mode comprises an identifier identifying a portion of said shareable resource that the requestor making said request wishes to access.

In another specific embodiment, shared optimistic lock requests have a counter associated with them, whereby an individual thread is not asked to retry checking in optimistic mode more than a set number of times, to avoid infinite loops. When the retry count is exhausted, a thread may be made to wait to obtain the lock in exclusive mode or abort, even if an optimistic retry could be done again.

In a computer-implemented method, each lock state descriptor further comprises a count of the number of attempts to access said lock in said shared optimistic mode, said one of the concurrently executing threads attempting to access said lock in said shared optimistic mode having its attempt to access said lock terminated when said count reaches a predetermined value.

In another specific embodiment, locks may be released from exclusive mode in either "amended" or "preserved" mode, to mark that a lock promoter from optimistic to exclusive mode has been successful/unsuccessful in altering the controlled structure. The "amended" mode or "preserved" mode is indicated in the CURRENT_MODE 202 or REQUESTED_MODE 204 of the lock state descriptor structure 200. Amended mode results in all optimistic to exclusive promotion waiters being released in optimistic mode, while preserved mode results in the next optimistic to exclusive promoter being released having gained exclusive access to the lock. In this embodiment, since the current thread, for whatever reason, could not successfully amend the substructure, the next thread should try to amend it, since it is still invalid and in need of modifications.

In a computer-implemented method, responsive to said one or more of the concurrently executing threads releasing said lock from said exclusive mode; updating a current mode or a requested mode in said lock state descriptor as being "amended" in order to indicate that a lock promoter from said optimistic mode to said exclusive mode was successful in altering said shareable resource being controlled by said lock; updating said current mode or said requested mode in said lock state descriptor as being "preserved" in order to indicate that said lock promoter from said optimistic mode to said exclusive mode did not make a change to the structure or said requested mode; and updating said current mode or said requested mode in said lock state descriptor as being "failed" in order to indicate that said lock promoter from said optimistic mode to said exclusive mode was unsuccessful in altering said shareable resource being controlled by said lock.

In another specific embodiment, a request to mark a new lock state may have options associated with it. A first example of the options is a "preserve lock state" or "propagate lock state", whereby once a higher lock level has completed and the current lock level is resumed, the lock can be reset to the state set in the current level or the state set by the higher level can be propagated to the current level. Once a thread has obtained a lock in exclusive mode because modification to a substructure is needed, it may be advantageous to keep the exclusive lock until all the parts of the complex structure are checked and amended, and release all optimistic lock requester at the end of all of the modifications, if it is expected that other subparts might need modifications. This avoids all other threads repeatedly stopping and waiting on the same lock for each other subpart that it has been found to be needing a refresh, thereby causing a bottleneck. On the contrary when no other subpart is expected to be needing modifications, reverting as quickly as possible to a read lock boosts concurrency.

In a computer-implemented method, said lock state descriptor further comprises an indication as to whether, on resuming a lower lock state from a higher lock state, the lock state should be reset to that of said lower lock state so as to preserve the previous lower lock state or the lock state should be propagated from said higher lock level to said lower lock level.

A second example of the options is "private", whereby higher lock levels may not acquire/release the lock on the ground that the structure being manipulated has not been published yet and therefore, being not visible to other threads, requires no locking. This may initially appear to be a step in the direction of obfuscating the locking scheme in that the function dictates that the structure should be protected, but the underlying setting is such that the lock is ignored. However, it is yet another setting that has to be explicitly chosen. The programmer has to understand the chosen locking scheme in order to be able to determine that a "private" state would be acceptable at higher levels in the chosen section of code.

In a computer-implemented method, higher lock levels do not acquire or release said lock if the shareable resource being managed by said lock has not been published.

Embodiments of the invention described above may provide the advantage of improved ability to debug the locking scheme. Prior art mutex implementations allow the use of debugable mutexes. Whilst it is possible to use a tool which, through use of code instrumentation or otherwise, is able to build a graph of lock requests and identify deadlocks, lock state descriptors 200, 220-260 according to the present invention allow a much greater range of problems to be detected.

An example of an error that can already be detected by prior art mutex implementations is a thread is attempting to lock a mutex that it already owns, such as, for example POSIX threads.

An example of a potential problem that cannot be detected by prior art implementations is a thread using a mutex in a recursive manner in places where it would not be expected. Recursive POSIX mutexes are reentrant at all times and cannot distinguish between the two uses. The use of lock state descriptors 200, 220-260 according to embodiments of the present invention allows the detection, and rejection, of threads 450-456 trying to use a lock 470 directly, that is, outside of the lock reentrant infrastructure, when previously the same lock 470 had been explicitly marked for recursive use, and the recursive use has not been terminated. The use of lock state descriptors 200, 220-260 according to embodiments of the present invention allows the detection of an attempted reentrant lock request when the lock 470 had already been acquired directly, that is, use of reentrant locks where reentrancy was not expected.

As a further example of a debugging facility, during the development phase, the underlying locking infrastructure may be set to detect when an individual thread 450-456 has acquired more than a threshold number of locks 470 as this might affect concurrency or induce deadlocks. Embodiments of the invention allow limits to be set individually for both recursive and non recursive lock requests.

In a similar way, embodiments of the invention allow a limit to be set on the number of levels 402-408 individual locks 470 can get to, so as to be able to detect combinations of stacked lock 470 requests that the programmer had not envisaged.

Detecting an optimistic lock request, whether with a specific ID or not, following a previous optimistic lock request with a different specific ID should indicate to a programmer that there is a problem.

In summary, embodiments of the present invention provide an extra lock state 408 coupled with the ability of releasing exclusive lock waiters in read mode 404 instead and a (stack or graph of effective or implied) lock state change. These provide the advantage of the ability to process, in parallel, a wider array of scenarios coupled with the ability to use reentrant code without any of the disadvantages of relockable mutexes.

The following example in pseudo C shows how an embodiment of the invention may be used. The following example does not describe aspects of embodiments of the invention, but instead describes solely how embodiments of the invention may be used.

In the pseudo C code below lock_init( ) lock_switch( ), and lock_free( ) are hypothetical functions that initialize, manipulate and dispose of passive wait read-write mutexes in the customary way.

The pseudo code below instantiates a complex structure:

```
int modify_structure_part_1(struct structdesc *in)
{
  lockstate_t *ls;
  result = SUCCESS;
  /* this part of the code must be done with an exclusive lock
     if one hadn't been acquired already and the structure
     has already been published
  */
  if ((ls = lockstate_mark(NONE, NONE, in->in_lock)) == NULL ||
     lockstate_switch(EXCLUSIVE, ls) == ERROR)
    return ERROR;
...
```

-continued

```
<modify structure>
...
  /* release the lock and signal if the structure has been modified */
  (void) lockstate_switch((result == SUCCESS? AMENDED:
     PRESERVED), ls);
  lockstate_restore(ls);
  return result;
}
<other functions, one per structure part>
int create_structure(void)
{
struct structdesc *in = NULL;
lockstate_t *ls;
int result = SUCCESS;
/* allocate and initialize new structure */
if (!(in = malloc(sizeof(structdesc))))
  return ERROR;
memset(in, 0, sizeof(structdesc));
/* allocate lock and mark lock state to be private */
if (lock_init(&in->lock) == ERROR)
  {
  free(in);
  return ERROR;
  }
if ((ls = lockstate_mark(PRIVATE, NONE, in->in_lock)) == NULL)
  {
  lock_free(&in->in_lock);
  free(in);
  return ERROR;
  }
/* populate individual structures */
  result = modify_structure_part_1(in);
...
  <and again for other structure parts>
...
  /* discard lock state descriptor */
  lockstate_restore(ls);
  /* append structure to list with lock acquired */
  (void) lock_switch(EXCLUSIVE, in->in_lock);
...
  <insert structure in list>
...
  (void) lock_switch(RELEASED, in->in_lock);
  return result;
}
The pseudo C code below manipulates part of a complex structure:
modify_structure_part_1(<pointer to structure>);
The pseudo C code below checks and possibly amends a complex structure:
int check_structure_part_1(struct structdesc *in)
{
  int result = SUCCESS;
  /* prevent writers from modifying the superstructure but
     allow parallel checks of individual substructures
  */
  if ((ls = lockstate_mark(NONE, PART1_ID, in->in_lock)) == NULL ||
     lockstate_switch(OPTIMISTIC, in->in_lock) == ERROR)
    return ERROR;
  for(;;)
  {
...
    <check structure part>
...
    if (<check successful>)
      break;
    /* promote the lock to exclusive to perform the modifications
    if the lock cannot be promoted - somebody has already done
    the required modifications - check again, again in parallel
    */
    if ((result = lockstate_switch(EXCLUSIVE, ls)) == RETRY)
      continue;
    if (result == ERROR)
      break;
    /* the lock has successfully been promoted, proceed to
       refresh the substructure
    */
    result = modify_structure_part_1(in, ls);
    break;
  }
  lockstate_restore(ls);
```

-continued

```
  return result;
}
The pseudo C code below disposes of a complex structure:
int destroy_structure(struct strucdesc *in)
{
  (void) lock_switch(ESCLUSIVE, in->in_lock);
  if (<structure has references>)
  {
    (void) lock_switch(RELEASED, in->in_lock);
    return ERROR;
  }
  ...
  <remove structure from list>
  ...
  (void) lock_switch(RELEASED, in->in_lock);
  ...
  <free memory structures>
  ...
  lock_free(in->in_lock);
  free(in);
  return SUCCESS;
}
```

Figure 10:
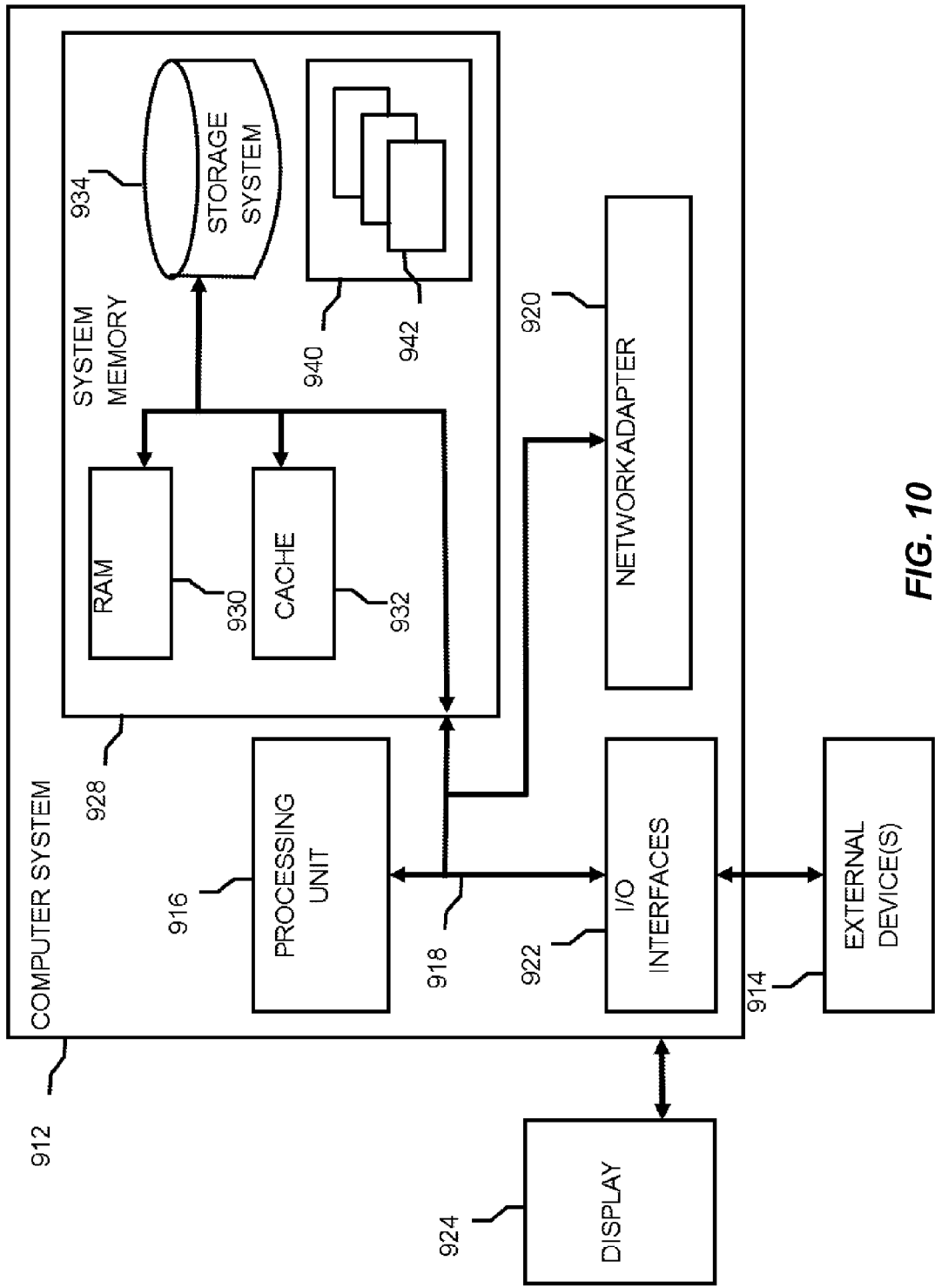
FIG. 10 depicts a computer system according to an embodiment of the present invention.

Referring now to FIG. 10, a schematic of an example of computing system is shown. Computing system 912 is only one example of a suitable computing system and is not intended to suggest any limitation as to the scope of use or functionality of embodiments of the invention described herein. Regardless, computing system 912 is capable of being implemented and/or performing any of the functionality set forth hereinabove.

Computer system/server 912 is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 912 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for managing access to a shareable resource between a plurality of concurrently executing threads, access to said shareable resource being controlled by a lock, said lock being adapted to be acquired by one or more of said plurality of concurrently executing threads in at least a shared mode, an optimistic mode and an exclusive mode and said lock maintaining a list of threads requesting ownership of said lock, the computer program product comprising:
a computer readable storage medium having program instructions embodied therewith, the program instructions executable by a computer to cause the computer to:
provide a shared optimistic mode for said lock, said lock being acquirable in said shared optimistic mode by one or more of said plurality of concurrently executing threads;
provide, for each change of mode requested by any thread of said plurality of concurrently executing threads, a lock state descriptor comprising an indication of a current mode, if any, in which said requesting thread has already acquired said lock;
responsive to one or more of said plurality of concurrently executing threads acquiring said lock in said shared optimistic mode, allow others of said plurality of concurrently executing threads to acquire said lock in said shared mode or said optimistic mode; and
responsive to one or more of said plurality of concurrently executing threads which has acquired said lock in said shared optimistic mode requesting to acquire said lock in said exclusive mode, prevent others of said plurality of concurrently executing threads which have acquired said lock in said shared mode or said optimistic mode from acquiring said lock in said exclusive mode until one or more of said plurality of concurrently executing threads which has acquired said lock in said shared optimistic mode requesting to acquire said lock in said exclusive mode releases the lock.

2. The computer program product of claim 1, wherein said lock state descriptor comprises an indication of the current relationship between said lock and any of said plurality of concurrently executing threads in which said requesting thread has already acquired said lock.

3. The computer program product of claim 1, wherein each request for a change of mode to said optimistic mode comprises an identifier identifying a portion of said shareable resource that the requestor making the request wishes to access.

4. The computer program product of claim 1, wherein each lock state descriptor further comprises a count of the number of attempts to acquire said lock in said shared optimistic mode, and any of said plurality of concurrently executing threads attempting to acquire said lock in said shared optimistic mode having its attempt to acquire the lock terminated when said count reaches a predetermined value.

5. The computer program product of claim 1, wherein:
responsive to one or more of said plurality of concurrently executing threads releasing said lock from said exclusive mode;
updating said current mode or a requested mode in said lock state descriptor as being "amended" to indicate that a lock promoter from said optimistic mode to said exclusive mode was successful in altering said shareable resource being controlled by said lock;
updating said current mode or said requested mode in said lock state descriptor as being "preserved" to indicate that said lock promoter from said optimistic mode to said exclusive mode did not make a change to the structure or said requested mode; and
updating said current mode or said requested mode in said lock state descriptor as being "failed" to indicate that said lock promoter from said optimistic mode to said exclusive mode was unsuccessful in altering said shareable resource being controlled by said lock.

6. The computer program product of claim 1, wherein said lock state descriptor further comprises an indication as to whether, on resuming a lower lock state from a higher lock state, a current lock state should be reset to that of said lower lock state so as to preserve the previous lower lock state or the current lock state should be propagated from said higher lock state to said lower lock state.

7. The computer program product of claim 1, wherein higher lock levels do not acquire or release said lock if said shareable resource being managed by said lock has not been published.

* * * * *